United States Patent [19]

Williams et al.

[11] Patent Number: 5,251,149

[45] Date of Patent: Oct. 5, 1993

[54] ELECTRONIC NUTATING DISC FLOW METER

[75] Inventors: Jeffrey J. Williams; Robert W. Calvert; Richard M. Kruse, all of Wichita, Kans.

[73] Assignee: Great Plains Industries, Inc., Wichita, Kans.

[21] Appl. No.: 739,846

[22] Filed: Aug. 2, 1991

[51] Int. Cl.$^5$ .............................. G01F 1/72; G01F 1/08
[52] U.S. Cl. .................. 364/510; 364/571.07; 73/861.77; 73/3
[58] Field of Search ............... 364/510, 509, 571.07, 364/571.04; 73/3, 861.77, 866.10

[56] References Cited

U.S. PATENT DOCUMENTS

| | | | |
|---|---|---|---|
| 128,338 | 6/1872 | Van Anden | 73/231 |
| 1,719,415 | 7/1927 | Back | 73/231 |
| 2,524,870 | 10/1950 | Adamtchik | 73/231 |
| 2,770,131 | 11/1956 | Sparling | 73/231 |
| 3,084,545 | 4/1963 | Waugh | 73/231 |
| 3,238,776 | 3/1966 | Potter | 73/231 |
| 3,329,021 | 7/1967 | Quesinberry | 73/229 |
| 3,332,500 | 7/1967 | Bristol | 170/160.6 |
| 3,370,465 | 2/1968 | Belle | 73/230 |
| 3,452,593 | 7/1969 | Lauter | 73/194 |
| 3,529,631 | 9/1970 | Riollet | 138/39 |
| 3,534,602 | 10/1970 | Boyd | 73/231 |
| 3,623,835 | 11/1971 | Boyd | 73/231 |
| 3,631,709 | 1/1972 | Smith et al. | 73/3 |
| 3,686,948 | 8/1972 | Lahave | 73/230 |
| 3,757,578 | 9/1973 | Clinton | 73/231 |
| 3,774,448 | 11/1973 | Gass | 73/231 |
| 3,823,310 | 7/1974 | Kalotay | 235/151.34 |
| 3,945,253 | 3/1976 | Liu | 73/231 |
| 4,073,601 | 2/1978 | Kress | 416/242 |
| 4,114,440 | 9/1978 | Stapler | 73/231 |
| 4,253,341 | 3/1981 | Iueda | 73/861.77 |
| 4,265,127 | 5/1981 | Onodo | 73/861.78 |
| 4,390,956 | 6/1983 | Cornforth et al. | 364/510 |
| 4,798,092 | 1/1989 | Lagergren et al. | 93/861.77 |
| 4,799,169 | 1/1989 | Mims | 364/510 |
| 4,829,449 | 5/1989 | Polesnak | 364/510 |
| 4,848,164 | 7/1989 | Quarve et al. | 73/861.77 |
| 4,872,351 | 10/1989 | Ruesch | 73/861.04 |
| 4,872,352 | 10/1989 | Alden et al. | 73/861.77 |
| 4,969,365 | 11/1990 | Strigard et al. | 73/861.77 |

Primary Examiner—Jack B. Harvey
Assistant Examiner—Ellis B. Ramirez
Attorney, Agent, or Firm—Lawrence E. Evans, Jr.

[57] ABSTRACT

The electronic nutating disc flow meter is suitable for measuring different liquids with varying viscosities. This meter is best suited for measuring medium viscosity fluids of 10 to 450 centipoise. This flow meter includes a microprocessor to correct for the nonlinearity of fluid flow. The memory in the microprocessor contains three calibration curves with accompanying lookup table information. CAL A is preset at the factory for thin viscosity fluids. CAL B is preset at the factory for medium viscosity fluids and CAL C can be field calibrated. The calibration curves can be plotted with up to five points per curve.

31 Claims, 18 Drawing Sheets

ELECTRONIC NUTATING DISC FLOW METER

BACKGROUND OF THE INVENTION

1. Field of the Invention

The electronic nutating disc flow meter (sometimes hereinafter flow meter) is suitable for measuring different liquids with varying viscosities. This flow meter is suitable for measuring thin viscosity liquids having a centipoise of less than 9, such as water. However, this flow meter is best suited for measuring medium viscosity liquids of 10 to 450 centipoise. This flow meter is often used to measure agricultural chemicals including, but not limited to, liquid herbicides, liquid pesticides and liquid fertilizers and may be field calibrated for greater accuracy with specific liquids. This flow meter includes a microprocessor to correct for the nonlinearity of fluid flow.

2. Description of the Prior Art

Fluid meters typically have some mechanical drive element immersed in the flow path of the fluid, such as a nutating disc, a paddlewheel or a turbine. Fluid flowing through the meter causes movement of the mechanical drive element immersed in the flow. This mechanical movement or rotational speed is generally proportional to the rate-of-flow of the fluid, so that by sensing the rotational speed a fluid meter can determine flow rate and/or volume. Unfortunately, the rotational speed of the mechanical drive element is not directly proportional to the flow. For example, doubling the flow rate will not double the rotational speed of the nutating disc in the flow meter. Furthermore, the rate of change is not constant throughout the useful flow range of the electronic nutating disc flow meter. This nonlinearity is well known to those skilled in the art. A graph known as a "K-Factor" plot clearly indicates the curved-line relationship between fluid flow rate and rotational speed of the mechanical drive element. Most importantly, nonlinearity becomes more pronounced for viscous fluids which creates instrument error.

Various attempts have been made to correct for this nonlinearity and thus improve the ultimate accuracy of fluid meters. See for example, U.S. Pat. No. 4,306,457; 4,581,946; 3,965,341; 4,593,365 and 4,885,943.

The present invention is typically installed in agricultural fluid delivery systems; however, it is not limited to agricultural applications. Scienco, Inc. of Memphis, Tenn., currently sells an electronic nutating disc flow meter, the model SEM-20. The Scienco meter is typically mounted at or near the pump in an agricultural fluid delivery system. The Fill-Rite Division of the Tuthill Corporation of Fort Wayne, Ind., also sells an electronic nutating disc flow meter, the model 810 digital meter. The Fill-Rite meter is typically mounted in-line and adjacent to the dispensing nozzle in an agricultural fluid delivery system. The Scienco and the Fill-Rite meters have a single calibration curve which is defined by a single point. Both of these products should be field calibrated to ensure accuracy when dealing with viscous agricultural fluids.

Both the Scienco and the Fill-Rite meters use one or more magnets which are immersed in the fluid stream and which are rotated by the nutating disc. One or more reed switches are isolated from the fluid flow and close a circuit each time the magnet rotates by the reed switch. The differences between the Scienco and the Fill-Rite meters and the present invention are discussed in greater depth in the Information Disclosure Statement filed concurrently herewith.

SUMMARY OF THE INVENTION

Modern agricultural chemicals are typically sold as concentrates which must be diluted with water before being applied to a crop or field. In a typical agricultural delivery system, a plastic storage tank containing a concentrated fluid, such as a herbicide, is mounted on a delivery truck or at a stationary location away from the field where the crops are grown. In order to apply the herbicide to the field, the concentrate must be dispensed from the storage tank to a vessel which is mounted on a tractor or an implement which is towed by the tractor. The delivery truck can be driven to the tractor in the field or the tractor must be driven to the stationary location to fill the on-board vessel with the concentrated agricultural fluid and water.

In a typical agricultural application, the farmer must dispense a specific amount of the concentrated fluid from the supply tank to the on-board vessel on the tractor or implement. Water is then added to the vessel to achieve the desired rate of dilution. Because of the strength of concentrated agricultural fluids, the specific amount which is dispensed into the on-board vessel becomes important to the farmer. In the case of a herbicide, if too little of the concentrate is metered into the on-board vessel, weeds may continue to grow and adversely effect crop yield. If too much of the herbicide concentrate is metered into the on-board vessel, it may kill the crop. In addition, herbicides such as Roundup ® by Monsanto are rather expensive, costing at retail approximately $56.00 per gallon.

In a typical agricultural fluid delivery system, a pump is mounted on a storage tank and is connected via a flexible hose to a dispensing nozzle. The typical agricultural dispensing nozzle is a ball valve having a handle with 90° of throw. Typically, the ball valve does not have an automatic shut-off similar to gasoline dispensing nozzles.

In the case of the Scienco meter, it is mounted on or near the pump and is connected to the flexible hose; it is remote from the dispensing nozzle. In the case of the Fill-Rite meter and the present invention, they are mounted in-line between the dispensing hose and the nozzle. The inlet port and the outlet port of the present invention are axially aligned on opposing sides of the housing which facilitates in-line plumbing between the dispensing nozzle and the hose. The present invention weighs approximately 1.66 pounds and therefore does not add an excessive amount of weight to the dispensing nozzle. The present invention utilizes a compact design which is approximately four inches in length, four inches in width and three inches thick, exclusive of porting, which facilitates mounting adjacent to the dispensing nozzle. It is convenient to have a meter mounted adjacent to the dispensing nozzle because it is easier for the operator to read the volume display.

When the operator is pumping fluid from the storage tank to the on-board vessel, the present invention gives a real time display of the volume of fluid which has actually been pumped. When the desired volume has been transferred, the dispensing nozzle can be manually shut off by the operator and the tank can be filled with water as required for diluting the concentrate.

The present invention includes a batch totalizer or register, which is analogous to a trip odometer in an automobile, and a cumulative totalizer or register which is analogous to the fixed odometer of an automobile. The batch totalizer can be reset to zero after a tank has been filled. The cumulative totalizer cannot be reset and gives a cumulative volumetric total of all fluid which has flowed through the meter until there is a battery change. The present invention uses three calibration curves referred to as "CAL A", "CAL B", and "CAL C". CAL A is for thin viscosity fluids having a centipoise of less than 9. CAL B is for medium viscosity fluids from 10 to 450 centipoise, like agricultural herbicides, and CAL C is for field calibration.

The calibration curves A and B are factory loaded with five points per curve and are locked into memory. Calibration curve C can be field calibrated with up to five points on the curve.

The present invention utilizes a lightweight, sturdy, compact design which facilitates mounting near the dispensing nozzle. The present invention is accurate and economical to mass produce due to its unique design which includes use of a microprocessor. The present invention is self-contained and battery powered for easy field operation. Low power requirements allow a long service life for the battery making frequent battery changes unnecessary.

The invention comprises an electronic flow meter for measuring volumetric fluid flow. A housing defines a central chamber, the housing having an inlet and an outlet permitting fluid communication with said central chamber. A metering assembly is positioned in said central chamber, the metering assembly defining an internal circular passageway having an inlet and an outlet. The inlet of the metering assembly is in fluid communication with the inlet of the housing and the outlet of the metering assembly is in communication with the central chamber of the housing, the assembly driving a device in response to fluid flow through the metering assembly. Means sense movement of the device and generate a sensing signal in response to the movement. Computer means, responsive to the sensing signal, determines a volumetric fluid flow through the flow meter and generates a volumetric signal representative of the determined volumetric fluid flow. Means store a plurality of calibrating curves defining a relationship between the sensing signal and its corresponding flow rate. Means, responsive to the volumetric signal, display a fluid volume corresponding to the determined volumetric fluid flow.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
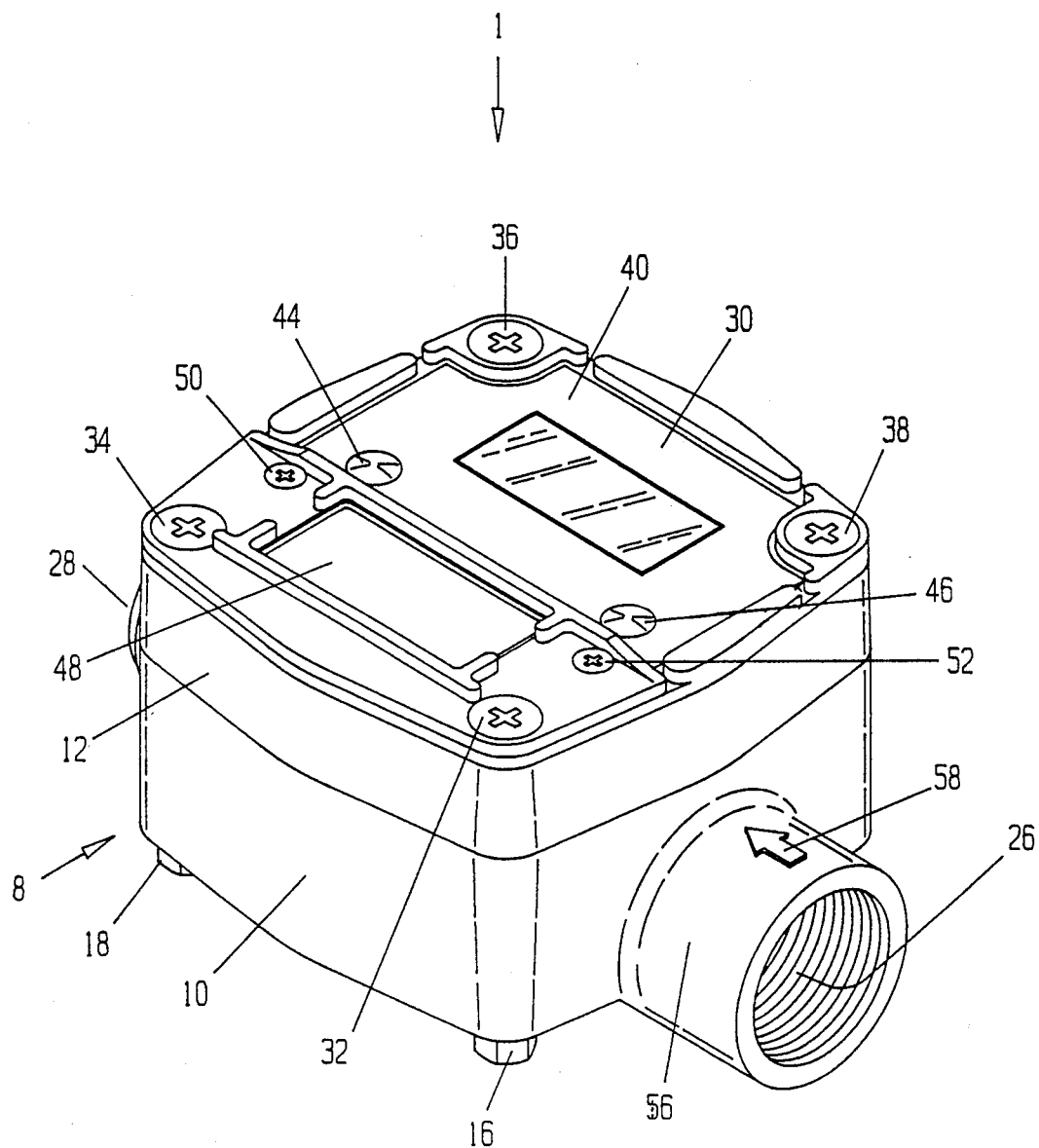
FIG. 1 is an isometric view of the electronic nutating disc flow meter.

Referring to FIG. 1, the electronic nutating disc flow meter is generally identified by the numeral 1. (For the sake of brevity the electronic nutating disc flow meter may sometimes hereinafter be simply referred to as the flow meter 1.) The housing 8 includes a base 10 and a cover plate 12. The housing 8 defines an internal central chamber 14 better seen in FIG. 4. The base 10 is connected to the coverplate 12 by a first bolt 16, a second bolt 18, a third bolt 22 and a fourth bolt 24. The base 10, includes an inlet port 26 and an outlet port 28 which permit fluid communication with the central chamber 14.

The base 10 and the coverplate 12 are formed from a composite material which for manufacturing convenience is injection molded. Various composite materials are suitable for this application; however, Applicants have determined that in the best mode the composite material is approximately 70 percent polyester, 20 percent glass fiber, and 10 percent carbon. The carbon is added to the composite material to reduce friction with other components and to provide a small amount of electrical conductivity to dissipate electric static buildup caused by the flowing fluids. Failure to dissipate static buildup, may interfere with operation of the electronic components, including the microprocessor described herein. Other materials which have chemical resistance to herbicides in addition to polyester may also be suitable for construction of the base 10 and the coverplate 12, such as nylon and PET (Polyethylene Terephthalate), which are within the scope of this invention.

Mounted on top of the coverplate 12 is a faceplate 30. The faceplate 30 is attached to the coverplate 12 by a first screw 32, a second screw 34, a third screw 36, and a fourth screw 38. A self-adhesive decal 40 is applied to the faceplate 30. A clear window 42 is included in the decal 40. The window 42 allows the operator to view a liquid crystal display which is described hereinafter. The orientation of the coverplate 12 and the faceplate 30 can be adjusted for the convenience of the operator. To change the orientation, simply remove the four bolts, 16, 18, 22 and 24, and remove the coverplate 12. It can be reassembled in any of four fixed positions to suit the operator. As shown in FIG. 1, the coverplate 12 and the faceplate 30 are adjusted to be read from the position of the letter B in FIG. 5. The coverplate 12 and the faceplate 30 can be repositioned to be read from the position of letter A in FIG. 5, from the position of letter C, or from the position of letter D.

The decal 40 covers a first dome switch 44 which is marked "Display" and may hereinafter sometimes be referred to as the Display button and a second dome switch 46 which is marked "Calibrate" and which may sometimes hereinafter be referred to as the Calibrate button. The dome switch 44 and the second dome switch 46 extend slightly above the surface of the faceplate 30 and create a slight protrusion in the decal 40. The structure and operation of these dome switches will be discussed hereinafter. For manufacturing convenience, the faceplate 30 is injection molded and is formed from amorphous nylon, water clear and UV stabilized. Other materials such as copolyester and acrylic could also be used to form the faceplate and are within the scope of this invention.

Attached to the top of the faceplate 30 is a removable battery cover 48. The battery cover 48 is attached to the faceplate 30 by screws 32, 34, 50 and 52. A seal 124 is captured between the battery cover 48 and the faceplate 30. The battery cover 48 may be easily and conveniently removed by the operator in the field to replace the battery 54 by simply removing the four screws 32, 34, 50 and 52. The battery cover 48 is injection molded for manufacturing convenience and is manufactured from the same composite materials as the base 10 and the coverplate 12. The battery 54 is located immediately below the battery coverplate 48 as will be better seen in FIG. 4.

The electronic nutating disc flow meter 1 is typically connected in an agricultural fluid delivery system which includes the following components which are not shown in the drawings. A storage tank will typically contain a large quantity of concentrated liquid. An electric pump will be mounted on the tank for dispensing the agricultural liquid into an on-board vessel. In a typical application, the tank may be mounted in a truck or a fixed location for dispensing a liquid into another on-board vessel typically mounted on a tractor or attached to an implement being drawn by a tractor. The truck will either go to the tractor in the field or the tractor will go to the fixed location for filling. A flexible hose which may typically be in the range of 10 to 14 feet long is connected from the pump to the inlet port 26 of the electronic nutating disc flow meter 1. The inlet snout 56 protrudes from the base 10 defining the inlet port 26. For the convenience of the operator, a direction arrow 58 is formed on the exterior of the inlet snout 56 to indicate proper flow direction. The outlet snout 60 defines the outlet port 28 and is connected to a dispensing nozzle. The dispensing nozzle is typically a ball valve actuated by a handle with 90° of operational throw. The typical agricultural dispensing nozzle is not the same as a typical dispensing nozzle for use with fuels such as gasoline. A typical gasoline nozzle has an automatic shut off which is not present in the typical agricultural dispensing nozzle.

Figure 2:
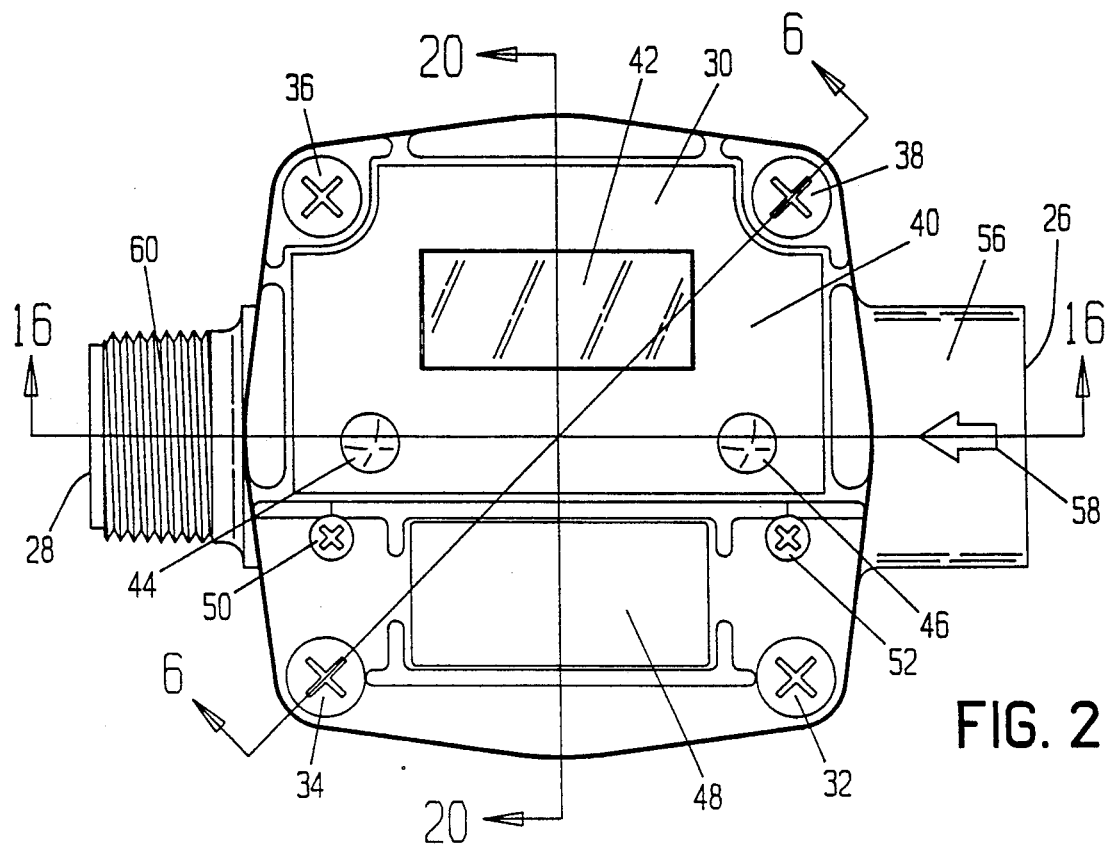
FIG. 2 is a top plan view of the electronic nutating disc flow meter shown in FIG. 1.

In FIG. 2, the inlet snout 56 and the outlet snout 60 are axially aligned on opposing sides of the base 10 to facilitate in-line plumbing in the agricultural fluid delivery system. As previously discussed, the inlet snout 56 is connected to a hose, not shown in the drawing, and the outlet snout 60 is connected to a dispensing nozzle, not shown in the drawing. This in-line plumbing arrangement allows the operator to look through the window 42 of the faceplate 30 while he is dispensing agricultural fluids and simultaneously operate the dispensing nozzle. The operator does not have to look back at the pump which may be mounted some distance away on the tank. Various operational and display functions of the electronic nutating disc flow meter 1 are selected by the operator by manipulation of the first dome switch 44 which is marked with the word "Display" on the decal 40 and the second dome switch 46 which is marked with the word "Calibrate" on the decal 40. The faceplate 30 is connected to the coverplate 12 by screws 32, 34, 36, and 38. The battery cover 48 is connected to the faceplate 30 by the screws 32, 34, 50 and 52.

Figure 3:
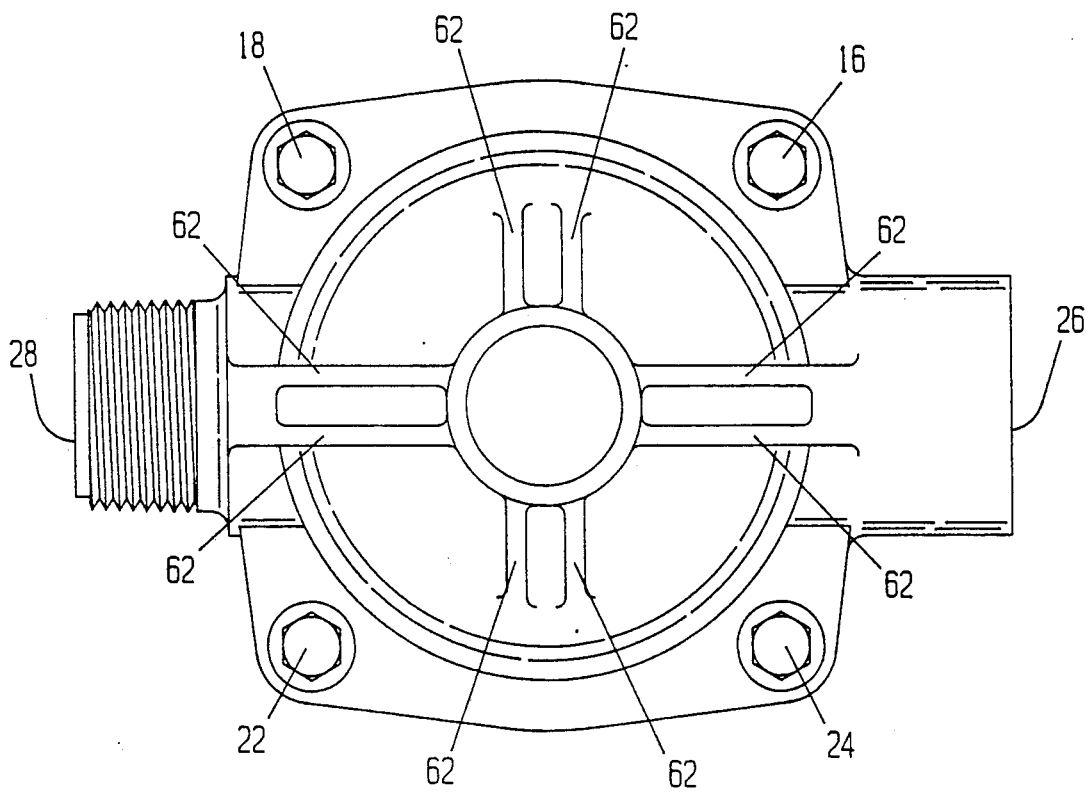
FIG. 3 is a bottom plan view of the electronic nutating disc flow meter shown in FIG. 1.

FIG. 3 shows the bottom of the base 10 which includes a plurality of ridges 62 which provide structural rigidity and strength to the base 10. Bolts 16, 18, 22 and 24 connect the base to the coverplate 12.

Figure 4:
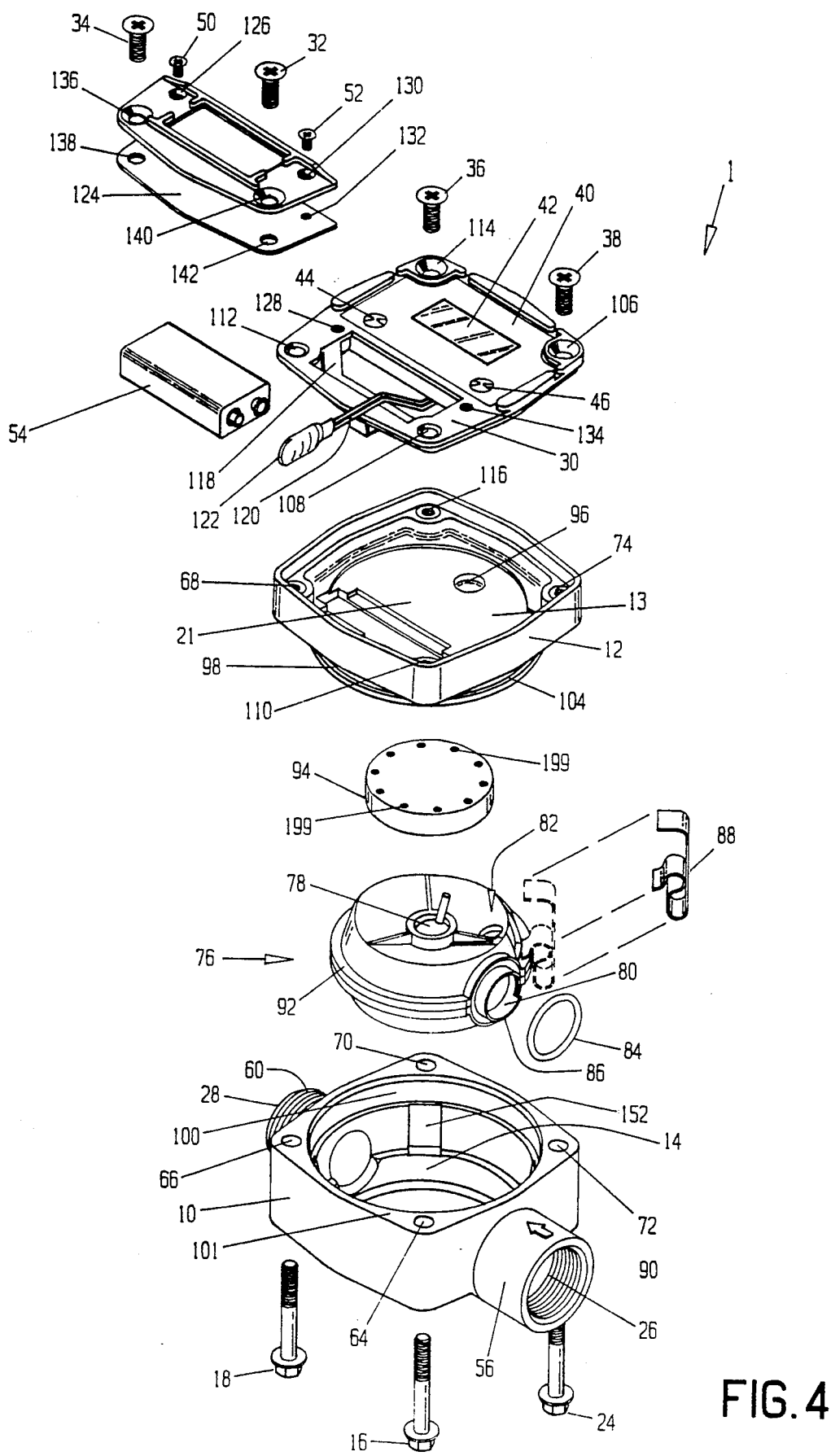
FIG. 4 is an exploded isometric view of the electronic nutating disc flow meter shown in FIG. 1.

FIG. 4 is an exploded view of the flow meter 1. Starting at the bottom, a housing 8 includes the base 10 and the coverplate 12. The housing 8 defines a central chamber 14 which has an inlet port 26 and a outlet port 28 allowing fluid communication between the central chamber 14 and the exterior of the housing 8. The base 10 is connected to the coverplate 12 by bolts 16, 18, 22, and 24. An aperture 64 is formed in the base 10 and allows the bolt 16 to pass through the base 10. The bolt threadably engages a female receptacle 110 formed in the coverplate 12. Another hole 66 is also formed in the base 10 allowing the bolt 18 to pass through the base 10 and threadably engage a female receptacle 68 in the coverplate 12. Another hole 70 is formed in the base 10 allowing the bolt 22 to pass through the base 10 and threadably engage a female receptacle 116 in the coverplate 12. Another hole 72 is formed in the base 10 which allows the bolt 24 to pass through the base 10 and threadably engage a female receptacle 74 in the coverplate 12.

A metering assembly is generally identified by the numeral 76 and includes a wobble disc 78. The metering assembly 76 defines an inlet port 80 and a plurality of openings which will be collectively referred to as the outlet port 82. An O-ring 84 is sized to fit around the inlet snout 86 of the inlet port 80 and seat in the O-ring groove 192. A clip 88 holds the metering assembly together and positions it inside of the central chamber 14. A slight recess 90 is formed on the interior of the housing 8 to receive the clip 88 and to prevent it from rotating as fluid passes through the central chamber 14. In actuality, there are three other clips better seen in FIG. 5 which stabilize the metering assembly 76 within the central chamber 14. Likewise, there are three other recesses on the interior of the housing 8 to receive each of these three retaining clips. The phantom lines show how the retaining clip engages the circumferential lip 92 of the metering assembly 76.

A signal generator disc is generally identified by the numeral 94. A plurality of slugs 199 are placed about the circumference of the signal generator disc 94.

The coverplate 12 has an upper recess 13 formed therein and a circular recess 96 which extends below the level of the upper recess 13. The circular recess 96 is sized and arranged to receive the pickup coil which will be discussed hereinafter. The bottom of the coverplate 12 includes a circular protrusion 98 which engages a circular seat 100 on the interior of the base 10. The protrusion 98 includes an O-ring groove 102 which receives an O-ring 104 which provides a fluid seal between the coverplate 12 and the base 10 preventing leakage of any fluids which may flow through the central chamber 14 of the flow meter 1.

The faceplate 30 includes a hole 106 which allows the screw 38 to pass through the faceplate and engage a female threaded receptacle 74 in the coverplate 12. Another hole 108 is formed in the faceplate 30 to allow the screw 32 to pass through the faceplate and engage the female threaded receptacle 110 in the coverplate 12. Another hole 112 is formed in the faceplate 30 which allows the screw 34 to pass through the faceplate 30 and engage a female threaded receptacle 68 in the coverplate 12. Another hole 114 is formed in the faceplate 30 to allow the screw 36 to pass through the faceplate 30 an engage the female threaded receptacle 116 in the coverplate 12.

A portion of the faceplate 30 is recessed to form a battery retainer 118 which receives the battery 54. In the preferred embodiment, the battery 54 is a 9 volt transistor battery. Connectors 120 extend from the circuit board and are connected to a terminal 122 which connects with the battery 54 which provides power to drive the microprocessor and LCD.

The battery cover 48 is connected to the faceplate 30 by the screws 32, 34, 50 and 52. A seal 124 is positioned between the battery cover 48 and the faceplate 30 to isolate water and other fluids from the electrical chamber 21. The electrical chamber 21 is defined by the battery cover 48, the faceplate 30, and the upper recess 13 formed in the coverplate 12.

There is a hole 126 in the battery cover 48 and an axially aligned hole in the seal 124 which permit the screw 50 to pass through the battery cover 48 and the seal 124 and threadably engage a female receptacle 128 in the faceplate 30. Likewise, there is another hole 130 in the battery cover 48 which is axially aligned with another hole 132 in the seal 124 allowing the screw 52 to pass through the battery cover 48, and the seal 124, and threadably engage a female receptacle 134, in the faceplate 30.

There is an additional hole 136 in the battery cover 48 which is axially aligned with another hole 138 in the seal 124 to allow the screw 34 to pass through the battery cover 48, the seal 124 and the faceplate 30 to threadably engage the female receptacle 68 in the coverplate 12. There is another hole 140 in the battery cover 48 which is axially aligned with a hole 142 in the seal 124 to permit the screw 32 to pass through the coverplate 48, the seal 124, and the faceplate 30, and threadably engage the female receptacle 110 in the coverplate 12.

Figure 5:
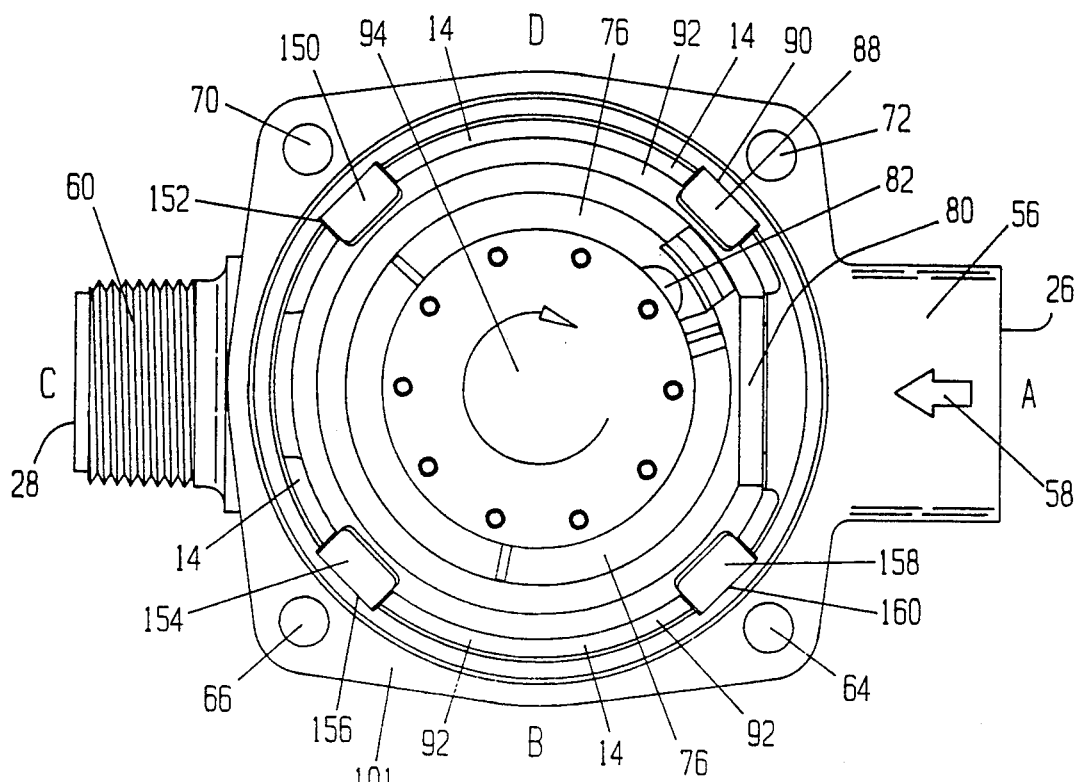
FIG. 5 is a top plan view of the electronic nutating disc flow meter with the coverplate removed, exposing the signal generator disc metering assembly in the central chamber.

FIG. 5 is a top plan view of the electronic nutating disc flow meter 1 with the coverplate 12 removed. The signal generator disc 94 is positioned on top of the metering assembly 76. The arrow in the drawing generally indicates the clockwise direction of rotation of the signal generator disc 94.

The metering assembly 76 is held in place in the central chamber 14 by a plurality of retaining clips. Retaining clip 88 engages the circumferential lip 92 of the metering assembly 76. The recess 90 on the interior of the base 10 holds the retaining clip 88 in place. A second retaining clip 150 likewise engages the circumferential lip 92 of the metering assembly 76. The retaining clip 150 fits in a recess 152 formed on the interior of the base 10. A third retaining clip 154 engages the circumferential lip 92 of the metering assembly 76. The retaining clip 154 fits in a recess 156 on the interior of the base 10. A fourth retaining clip 158 engages the circumferential lip 92 of the metering assembly 76. The retaining clip 158 is held in place by a recess 160 on the interior of the base 10. The retaining clips 88, 150, 154 and 158 together exert downward pressure on the circumferential lip 92 holding the metering assembly together and stabilizing its position in the central chamber 14.

The flow path of fluid through the flow meter 1 is as follows. Fluid enters through the inlet port 26 of the housing 8 and passes through the inlet port 80 of the metering assembly 76. The passage of fluid through the metering assembly 76 causes the wobble disc 78 to nutate or wobble to and fro which causes the signal generator disc 94 to rotate in a clockwise fashion as shown by the direction arrow in the drawing. The nutating motion of the wobble disc 78 is transferred to the signal generator disc 94 through a drive pin 162 which protrudes from the wobble disc 78 through an aperture 164 in the metering assembly 76. After the fluid has flowed through the metering assembly 76 it exits through a plurality of openings generally identified as the outlet port 82. The fluid then passes through the central chamber 14 and exits the flow meter 1 through the outlet port 28.

Figure 6:
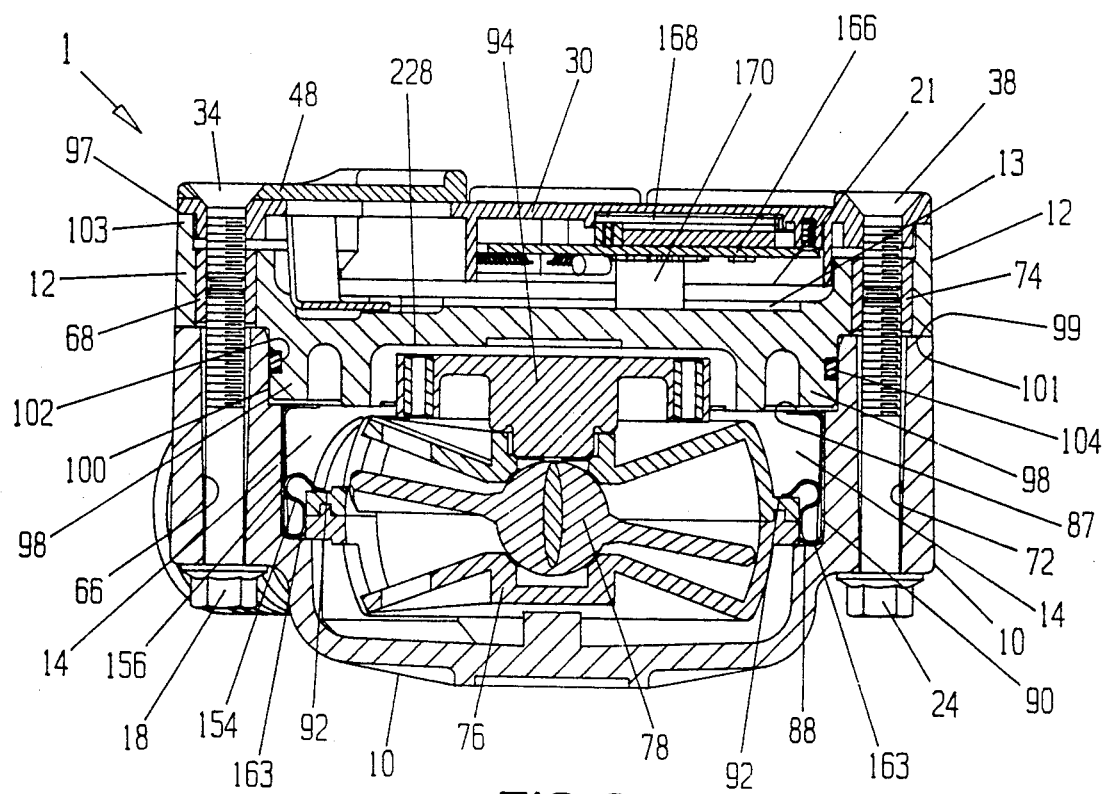
FIG. 6 is a section view of the electronic nutating disc flow meter line 6—6 of FIG. 2.

Referring to FIG. 6, the flow meter 1 is shown in section view fully assembled with all components in place. The battery cover 48 fits on top of the faceplate 30 which fits on top of the coverplate 12 which engages the base 10. The battery coverplate 48, the faceplate 30 and the upper recess 13 in the coverplate 12 together define an electrical chamber 21 which is isolated from fluid flow through the central chamber 14.

The coverplate 12 and the base 10 create a housing 8 which defines a central chamber 14 through which fluid flows. The signal generator disc 94 and the metering assembly 76 are positioned in the central chamber 14 and are immersed in fluid flowing through the flow meter 1. The O-ring 104 mounted on the circular protrusion 98 of the coverplate 12 seals against the circular seat 100 on the interior of base 10 forming a fluid tight seal for the central chamber 14.

A downward facing shoulder 99 is formed about the lower perimeter of the coverplate 12. An upward facing shoulder 101 is formed about the upper perimeter of the base 10. When assembled, the shoulder 99 of the coverplate 12 abuts the shoulder 101 of the base 10.

A downward facing shoulder 97 is formed about the lower perimeter of the faceplate 30. An upward facing shoulder 103 is formed about the upper perimeter of the coverplate 12. When assembled the shoulder 97 of the faceplate 30 abuts the shoulder 103 of the base 10.

The metering assembly 76 is held in place by a series of clips 88, 150, 154, and 158. The clips engages the circumferential lip 92 which partially encircles the metering assembly 76. The clips are held in place by a plurality of recesses in the base 10. Clip 88 engages recess 90, clip 154 engages recess 156. The top of the clips engage the bottom 87 of the circular protrusion 98 of the coverplate 12 to hold the clip in place and prevent unwanted movement resulting from fluid flow through the central chamber 14. The bottom of the clips engage an upward facing circular shoulder 163 formed in the base 10. The coverplate 12 is secured to the base 10 by four bolts, two of which are shown in this figure. Bolt 24 passes through the hole 72 in the base 10 and threadably engages a female receptacle 74 in the coverplate 12. Bolt 18 passes through the hole 66 in the base 10 and threadably engages the female receptacle 68 in the coverplate 12.

The electrical chamber 21 contains the circuit board 166, the battery 54, the liquid crystal display (LCD) 168 and the pickup coil . The electrical chamber 21 is isolated from fluid flow through the central chamber 14. The battery cover 48 is held in place by four screws, one of which, 34, is shown in this view. Screw 34 passes through hole 136 in the battery cover and hole 138 in the seal 124 and threadably engages the female receptacle 68 in the coverplate 12. The faceplate 30 is likewise held in place by four screws, one of which, 38, is shown in this view. Screw 38 passes through hole 106 in the faceplate 30 and threadably engages the female receptacle 74 in the coverplate 12.

Figure 7:
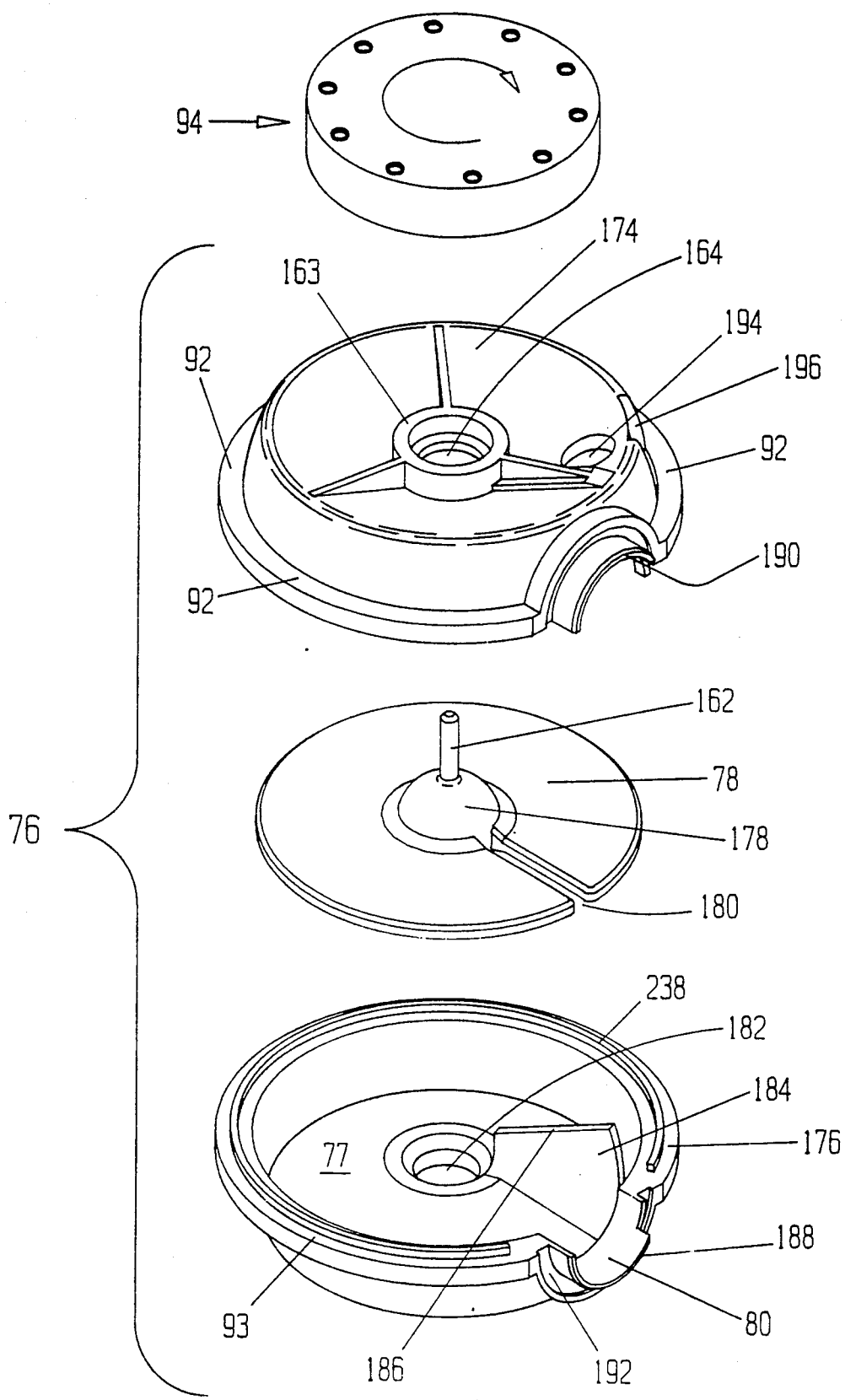
FIG. 7 is an exploded isometric view of the signal generator disc and the metering assembly.

Referring to FIG. 7, the metering assembly is generally identified by the bracket and the numeral 76. The signal generator disc is generally identified by the numeral 94. The metering assembly includes a top shell 174 which is sized and arranged to engage a bottom shell 176. The wobble disc 78, which may also from time to time be referred to as a nutator disc, fits in between the top shell 174 and the bottom shell 176 of the metering assembly 76. The wobble disc 78 includes a drive pin 162 which protrudes from the central spherical core 178. A radial slot 180 extends from the outer circumference of the central spherical core 178 to the outer circumference of the wobble disc 78. The central spherical core 178 engages and nutates in a first circular journal 182 in the bottom shell 176. The central spherical core 178 engages and nutates in a second circular journal 165 formed in the top shell 175, better seen in FIG. 11.

A stabilizing vane 184 is formed in the bottom shell 176 and fits loosely in the slot 180 of the wobble disc 78. The top 186 of the stabilizing vane 184 touches the interior wall 173 of the top shell 174 thus capturing the wobble disc 78 causing it to nutate as fluid passes through the metering assembly. The bottom shell 176 includes an inlet snout 188 which combines with a similar inlet snout 190 protruding from the top shell 174 to define an inlet port 80 for the metering assemble 76. An O-ring groove 192 encircles the snouts 188 and 190 and receives O-ring 84.

The top shell 174 includes two openings, 194 and 196 which together with similar openings 234 and 236 in the bottom shell 176 define the outlet port 82 of the metering assembly 76. The metering assembly 76 and the wobble disc 78 define an internal circular passageway 77 through which fluid flows in the metering assembly 76. As the wobble disc 78 nutates, the drive pin 162 rotates in a clockwise circular arc causing the signal generator disc 94 to rotate in a clockwise fashion as shown by the direction arrow in the drawing.

Figure 8:
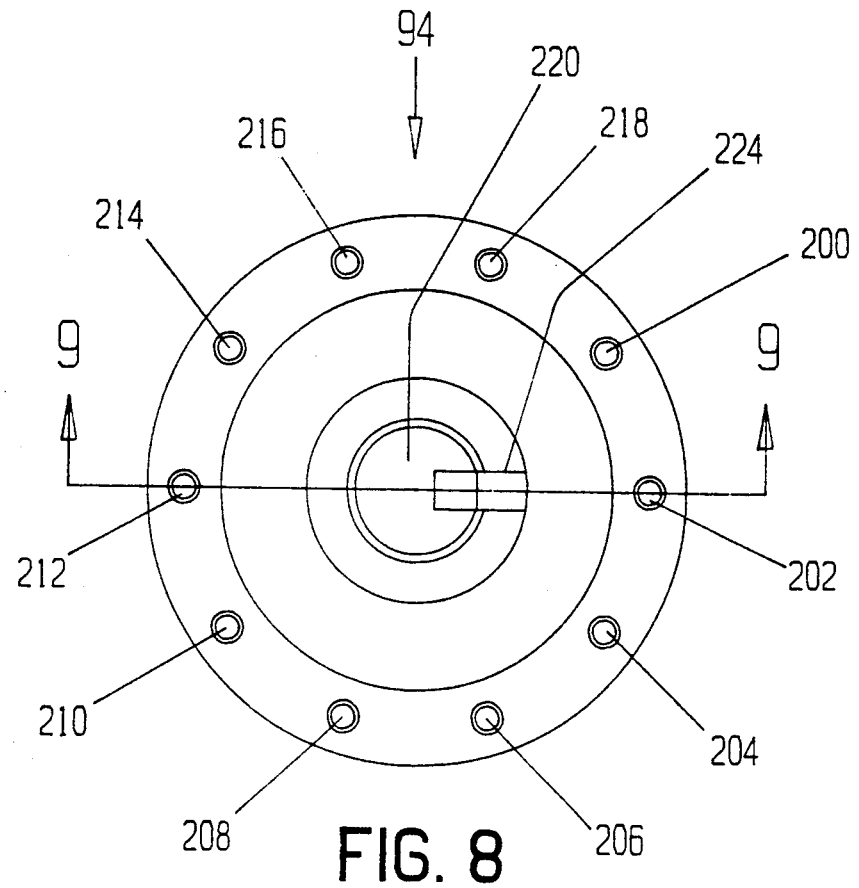
FIG. 8 is a bottom plan view of the signal generator disc.
Figure 9:
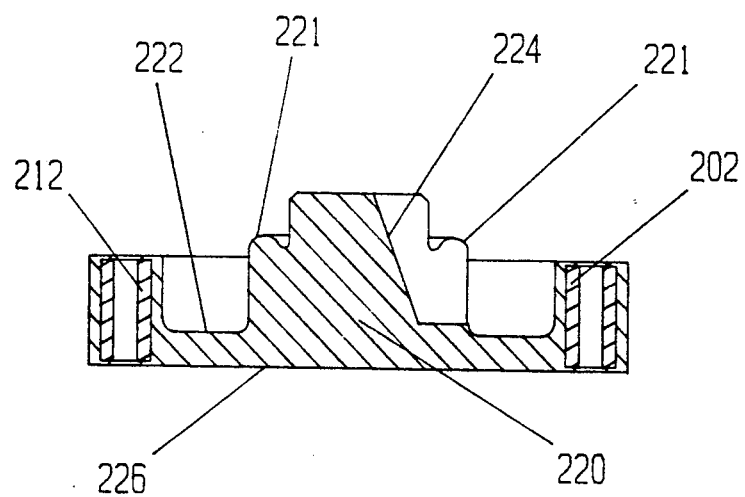
FIG. 9 a section view of the signal generator disc along the line 9—9 of FIG. 8.

FIG. 8 is a bottom plan view of the signal generator disc 94 and the slugs 199. There are ten specific slugs 200, 202, 204, 206, 208, 210, 212, 214, 216 and 218 positioned about the circumference of the signal generator disc 94. In the preferred embodiment the slugs which will be generically identified by the numeral 199 are formed from ferrite. The slugs 199 are non-magnetized to avoid any pickup of rust or metal debris from the fluid. A central drive shaft 220 protrudes from the bottom face 222 of the signal generator disc 94. A keyway 224 is formed in the central drive shaft 220. The drive pin 162 engages in the keyway 224 of the signal generator disc 94. When fluid passes through the flow meter 1, it causes the wobble disc 78 to nutate thus causing the drive pin 162 to rotate in a circular arc which causes the signal generator disc 94 to rotate in a clockwise direction.

The top surface 226 of the signal generator disc 94 will from time to time be in rotational contact with the bottom surface 228 of the coverplate 12 causing friction. The signal generator disc 94 is a free floating apparatus emersed in the fluid stream passing through the central chamber 14 of the flow meter 1. The fluid will reduce the degree of friction between the signal generator disc 94 and the coverplate 12; however, care needs to be taken regarding selection of proper components to minimize the amount of friction and thus maximize accuracy and the serviceable life of the flow meter 1. The signal generator disc is formed from a composite material which should include a friction reducing component such as PTFE. Other friction reducing materials may also be suitable in this application such as carbon or molybdenum disulfide. In the preferred embodiment, Applicant has determined that a suitable composite material for the friction generator disc is 55% polyester, 30% glass beads and 15% PTFE. It may be possible to form the signal generator disc entirely from PTFE or some other similar material which is also within the scope of this invention. Applicant recommends that the ferrous slugs be recessed approximately 0.010 to 0.015 inches from the top surface 226 of the signal generator disc to allow for uninterrupted wear during the life of the flow meter 1.

Applicant has also determined that the gap between the pickup coil 170 and the top of the ferrous slugs 199 is optionally in the range of 0.097 inches to 0.173 inches when ten slugs are used. This gap is identified by the bracket and the letter Z in FIG. 20. The size of the gap may vary from this range depending on the number and size of slugs actually used.

Figure 10:
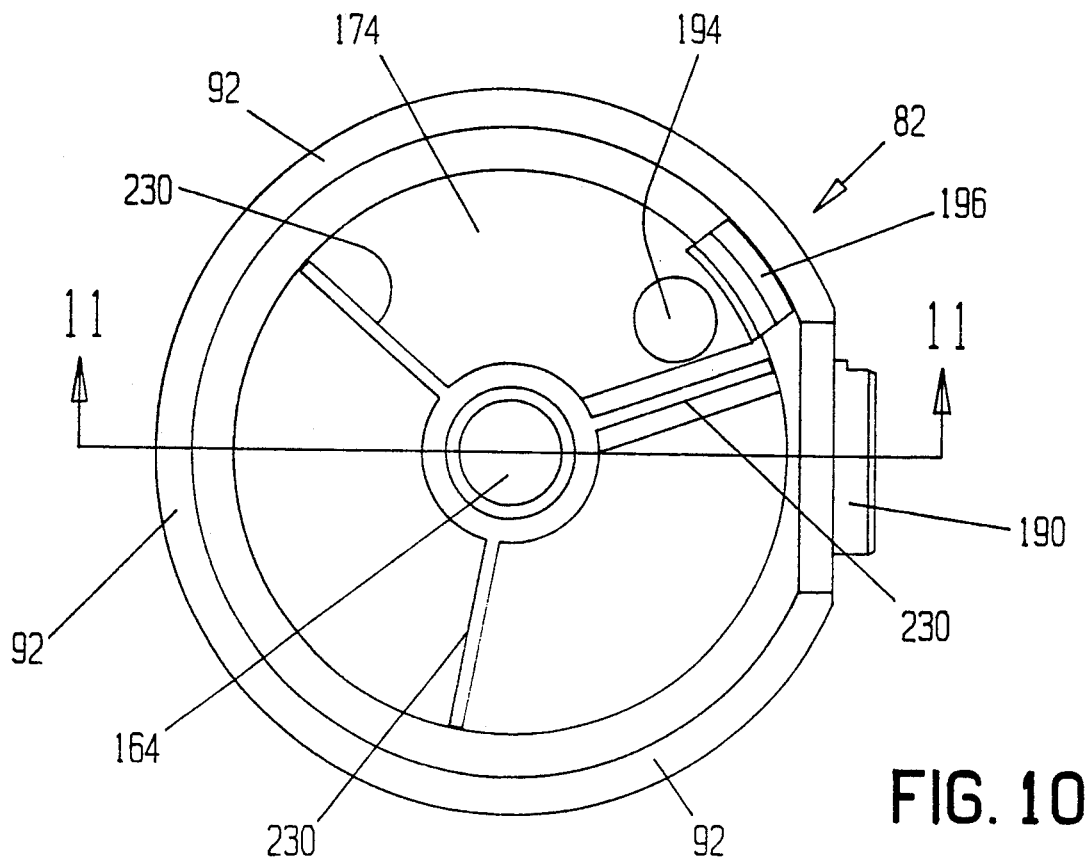
FIG. 10 is a top plan view of the top shell of the metering assembly.

FIG. 10 is a top plan view of the top shell 174 of the metering assembly 76. The circumferential lip 92 encircles a portion of the top shell 174. The drive pin 162 protrudes through a central aperture 164 in the top shell 174. A plurality of reinforcing ridges 230 radiate from the central aperture 164. A first hole 194 and a second hole 196 are formed in the top shell 174 and together with similar holes 234 and 236 in the bottom shell 176 form the outlet port 82 of the metering assembly 76. The inlet snout 190 protrudes from the top shell 174 and together with the inlet snout 188 define an inlet port 80.

Figure 11:
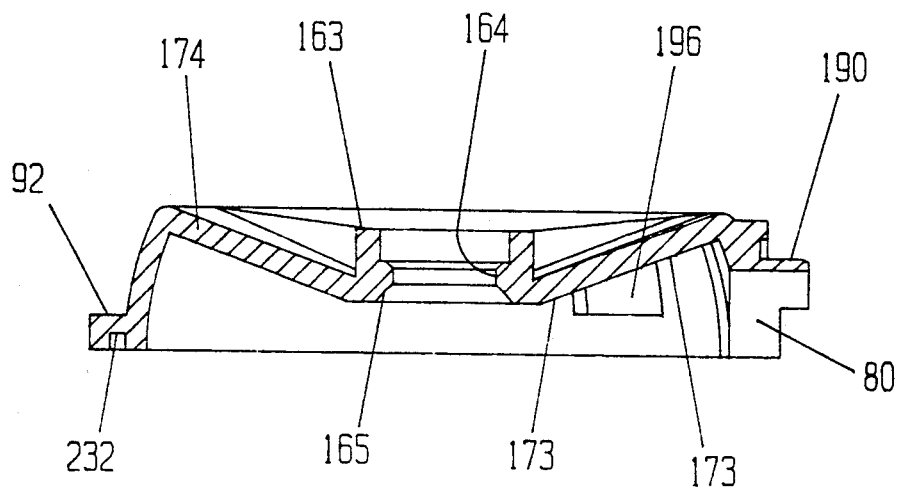
FIG. 11 is a section view of the top shell of the metering assembly along the line 11—11 of FIG. 10.

FIG. 11 is a section view along the line 11—11 of the top shell 174. The circumferential lip 92 includes a channel 232 which is formed throughout the entirety of the circumferential lip 92. The drive pin 162 extends through the central aperture 164. The upper surface of the central spherical core engages the second circular journal 165 found in the top shell 174.

Figure 12:
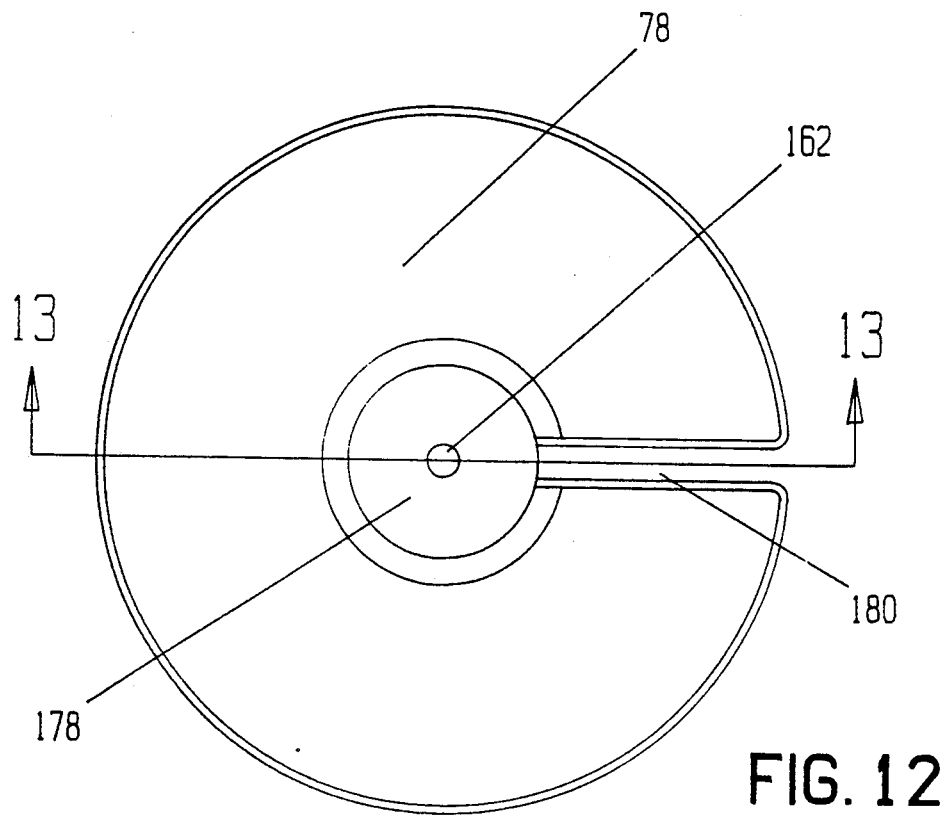
FIG. 12 is top plan view of the wobble disc.

FIG. 12 is a top plan view of the wobble disc or the nutator disc 78. A central spherical core 178 is formed in the center of the disc to support and hold the protruding drive pin 162. The core 178 engages second circular journal 165 in the top shell 174 and the journal 182 in the bottom shell 176. A radial slot 180 extends from the outer circumference of the central spherical core 178 to the outer circumference of the wobble disc 78. The slot 180 loosely engages the stabilizing vane 184 thus preventing the wobble disc 78 from spinning inside the metering assembly 76 as fluid passes from the inlet 80 to the outlet 82. The clearance between the slot 180 and the stabilizing vane 184 is loose enough to permit the wobble disc 78 to freely nutate in response to fluid flow.

Figure 13:
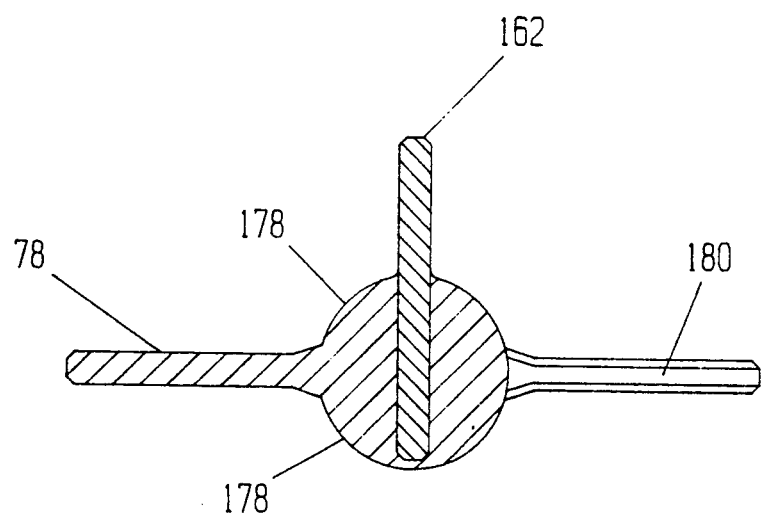
FIG. 13 section view of the wobble disc along the line 13—13 of FIG. 12.

FIG. 13 is a section view of the wobble disc 78. The central spherical core 178 protrudes both above and below the horizontal axis of the disc. The drive pin 162 is firmly embedded and captured in the spherical core 178. Applicants recommend that the drive pin 162 be formed from stainless steel or some other material suitable for a harsh chemical environment.

Figure 14:
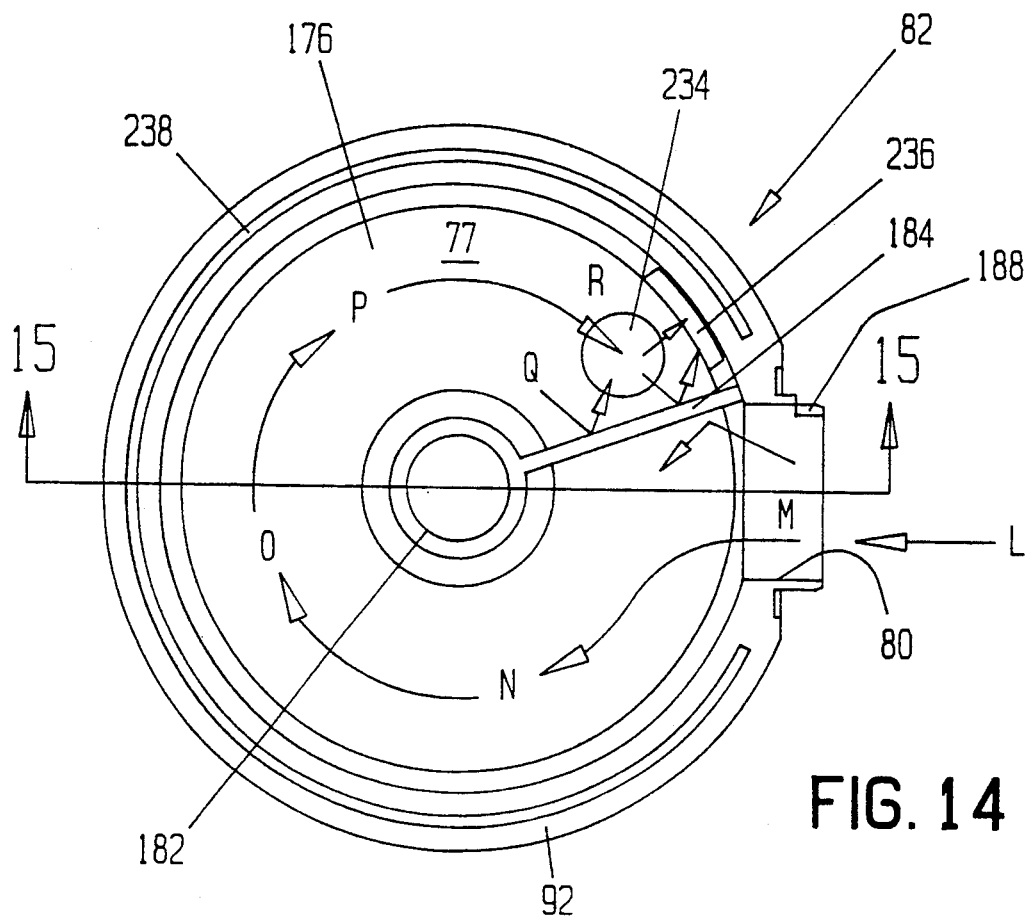
FIG. 14 is top plan view of the bottom shell of the metering assembly.

FIG. 14 is a top plan view of the interior of the bottom shell 176 of the metering assembly 78. In the center of the bottom shell 176, a journal 182 is formed to receive and engage the bottom surface of the central spherical core 178 of the wobble disc 78. A stabilizing vane 184 protrudes from the bottom shell 176. A first hole 234 and a second hole 236 are formed in the bottom shell 176 and together with the holes 194 and 196 in the top shell 174 define the outlet 82 of the metering assembly 76. An inlet snout 188 extends from the bottom shell 176. The inlet snout 190 and the inlet snout 188 together define the inlet port 80 of the metering assembly 76. A circular ridge 238 extends from the lower circumferential lip 92 and engages the channel 232 in the upper circumferential lip 92 of the top shell 174 to provide mechanical alignment and sealing between the top shell 174 and the bottom shell 176. Fluid flow through the internal circular passageway 77 is indicated by the flow arrows in FIG. 14.

Figure 15:
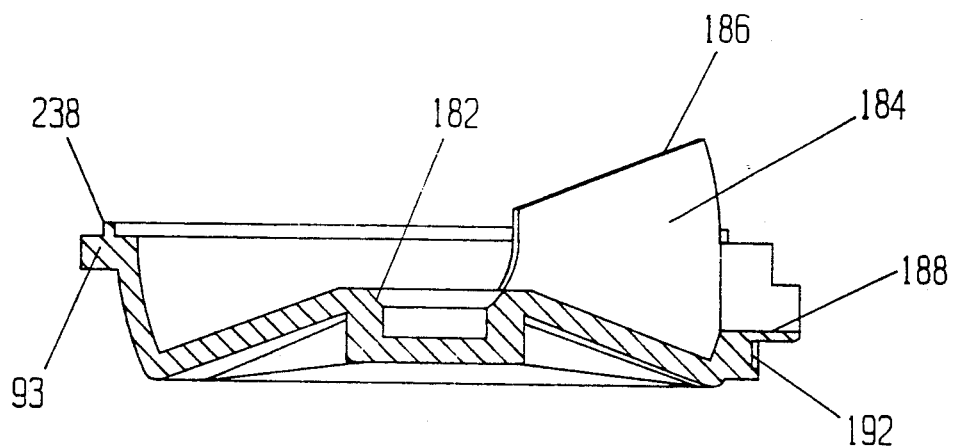
FIG. 15 is a section view of the bottom shell of the metering assembly along the line 15—15 of FIG. 14.

FIG. 15 is a section view of the bottom shell 176 along the line 15—15 of FIG. 14. The stabilizing vane 184 protrudes from the bottom shell 176 and the upper edge 186 engages the interior surface 173 of the top shell 174 creating a circular passageway 77 from the inlet 80 to the outlet 82 in the metering assembly.

An O-ring groove 192 is formed about the inlet snouts 188 and 190 to effect a seal between the metering assembly 76 and inlet port 26 of the base 10.

Figure 16:
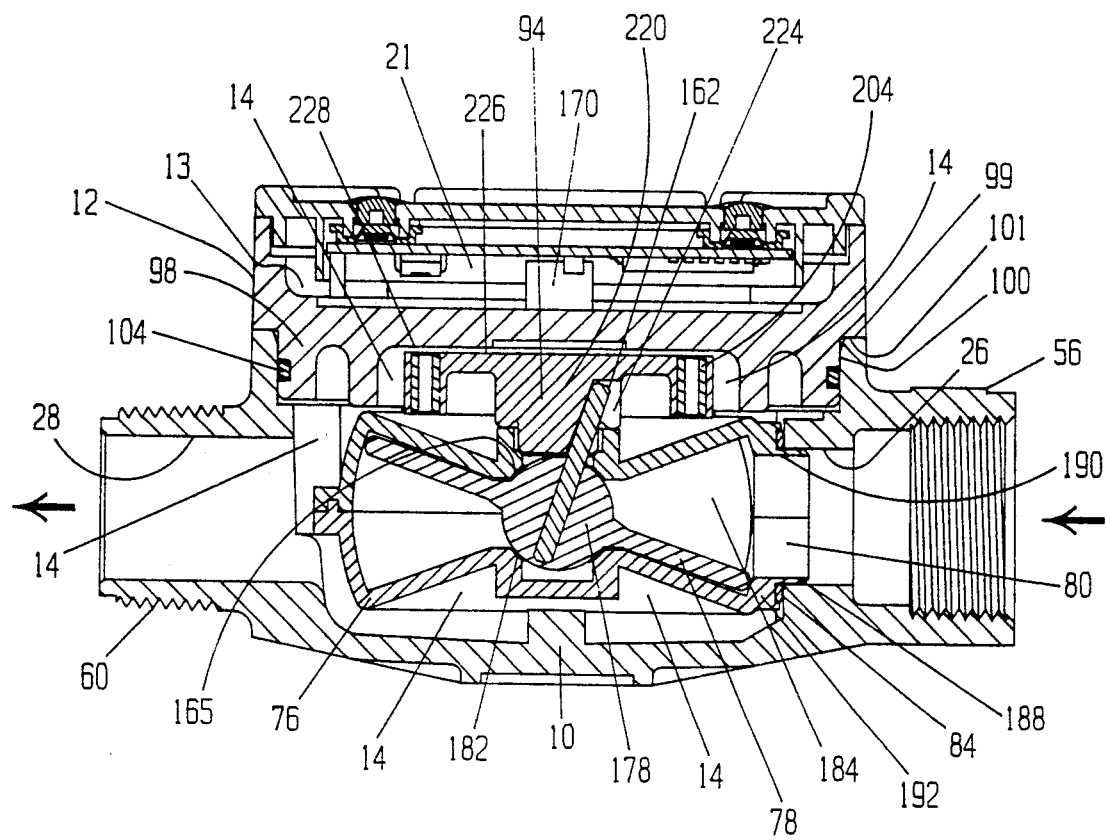
FIG. 16 is a section view of the electronic nutating disc flow meter along the line 16—16 of FIG. 2 showing the wobble disc inclined toward the inlet in the start position.
Figure 17:
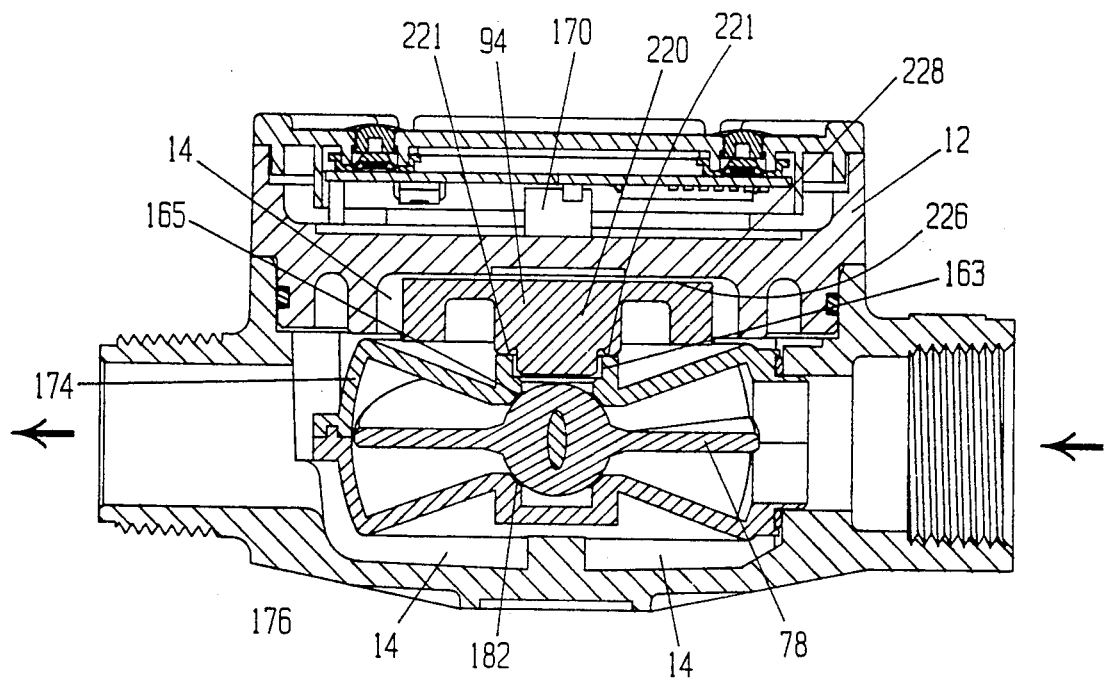
FIG. 17 is a section view of the electronic nutating disc flow meter along the line 16—16 of FIG. 2. The wobble disc has advanced 90° in a clockwise direction from the start position shown in FIG. 17 and is inclined toward the letter B in FIG. 5.
Figure 18:
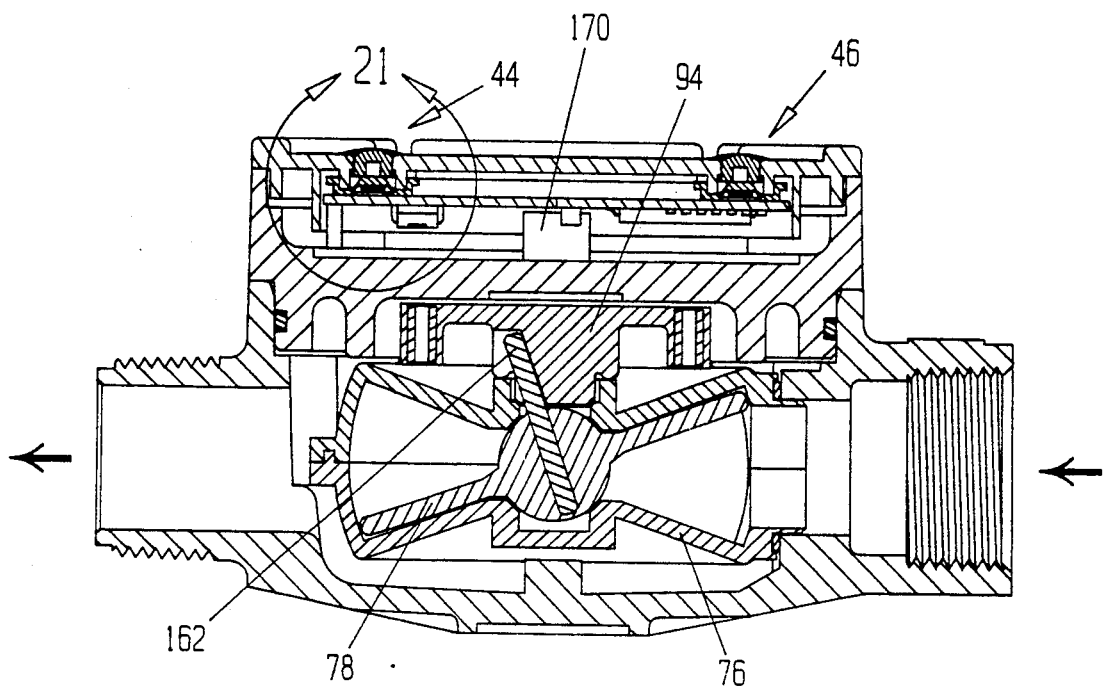
FIG. 18 is a section view of the electronic nutating disc flow meter along the line 16—16 of FIG. 2. The wobble disc has advanced 180° from the start position shown in FIG. 16 and is now inclined toward the outlet.
Figure 19:
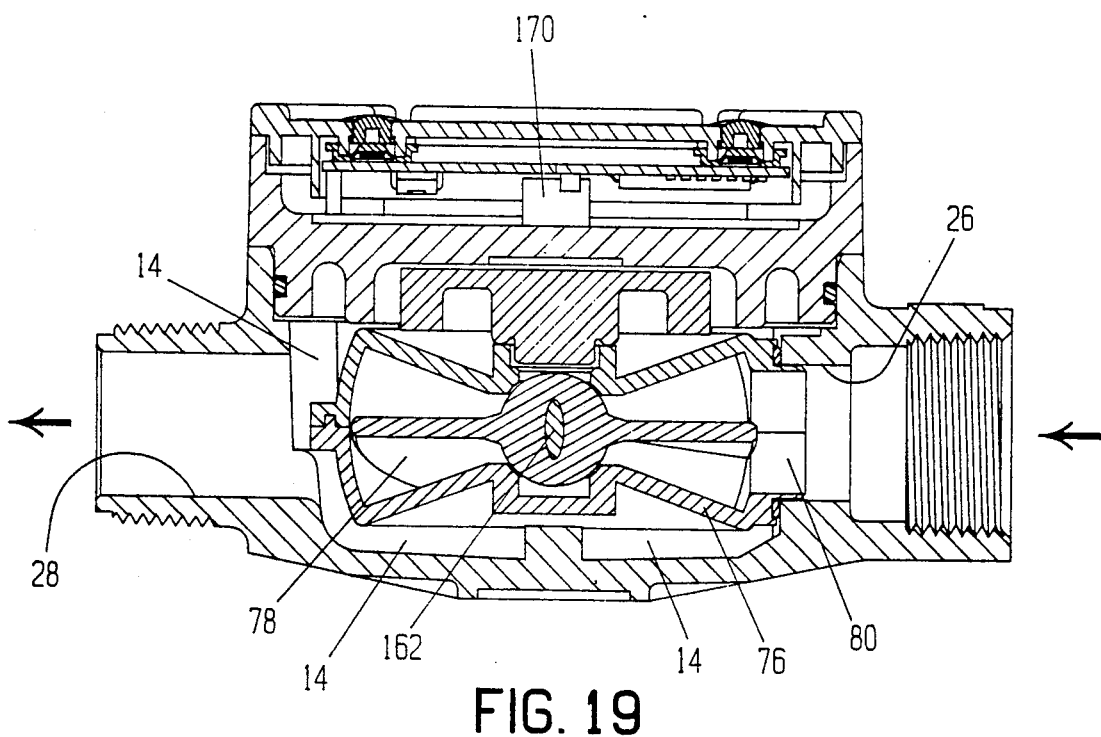
FIG. 19 is a section view of the electronic nutating disc flow meter along the line 16—16 of FIG. 2. The wobble disc has advanced 270° from the start position shown in FIG. 16 and is now inclined toward the letter D in FIG. 5.

FIGS. 16, 17, 18 and 19 will show one complete revolution of the signal generator disc 94 and one complete nutation of the wobble disc 78. This series of drawings will also show the flow path of fluid through the flow meter 1 and the metering assembly 76. In FIG. 16, the drive pin is inclined towards the inlet port 26 which will henceforth be referred to as the start position. FIG. 17 shows the wobble disc 78 advanced 90° in a clockwise direction from the start position of FIG. 16. FIG. 18 shows the wobble disc 78 advanced 180° in a clockwise direction from the start position and FIG. 19 shows the wobble disc 78 advanced 270° in a clockwise direction from the start position.

FIG. 16 is a section view of the electronic nutating disc flow meter 1 taken along the line 16—16 of FIG. 2. The base 10 and the coverplate 12 form a housing 8 which defines a central chamber 14. The inlet snout 56 protrudes from the base 10 and defines an inlet port 26. The outlet snout 60 protrudes from the base 10 and defines an outlet port 28. Fluid enters the flow meter 1 as indicated by the directional arrow in the drawing through the inlet port 26, passes through the central chamber 14 and exits through the outlet port 26 as shown by the arrow in the drawing.

The coverplate 12 includes an upper recess 13, a circular protrusion 98 and a bottom surface 228. The circular protrusion 98 includes a circumferential O-ring groove 102 which receives the O-ring 104. The interior portion of the base 10 includes a circular seat 100 and an upward facing shoulder 101 The coverplate 12 and the circular protrusion 98 define a downward facing shoulder 99. When assembled the coverplate 12 fits into the base 10 with the shoulder 99 abutting the shoulder 101 causing the O-ring 104 to seal against the circular seat 100. The O-ring and the coverplate 12 together with the base 10 form a fluid tight central chamber 14 which isolates fluid flow from the electrical chamber 21.

The metering assembly 76 is positioned in the central chamber 14 with the signal generator disc 94 positioned between the metering assembly 76 and the coverplate 12

The inlet snout 190 of the top shell 174 and the inlet snout 188 of the bottom shell 176 are inserted into the inlet port 26. The O-ring 84 forms a seal between the inlet port 26 and the metering assembly 76 as shown in the drawing. Fluid therefore passes from the inlet port 26 of the housing 8 into the inlet port 80 of the metering disc 76.

As shown in FIG. 16, the wobble disc 78 and the drive pin 162 are tilted downward toward the inlet port 26 of the housing 8. The drive pin 162 is tilted in the direction of the letter A in FIG. 5 which is identified as the start position. Fluid enters the inlet port 26 of the base 10. The fluid then enters the inlet port 80 of the metering assembly 76. As the fluid passes into the internal circular passageway 77 within the metering assembly 76, it encounters the stabilizing vane 184 as shown by the flow arrow M in FIG. 14. The stabilizing vane 184 extends from the floor of the bottom shell 176 to the ceiling of the top shell 174 thereby urging fluid into a clockwise flow path through the internal circular passageway 77 of the metering assembly 76. As the fluid moves in the clockwise flow path to the position indicated by the flow arrow N in FIG. 14, it causes the wobble disc 78 to nutate inside the internal circular passageway 77 of the metering assembly 76. The wobble disc 78 moves from the start position shown in FIG. 16 to a more advanced position shown in FIG. 17.

In FIG. 17, the drive pin 162 has now rotated in a clockwise direction 90° from the start position of FIG. 16 and is now tilting toward the letter B shown in FIG. 5. As the drive pin has advanced 90° from the start position, the signal generator disc has also been rotated 90° from its initial start position shown in FIG. 16.

The central spherical core 178 of the wobble disc 78 bears against the journal 182 of the bottom shell 176 and against the second circular journal 165 of the top shell 174. The drive shaft 220 of the signal generator disc 94 defines a circular shoulder 221 which abuts a circular shoulder 163 in the upper surface of the top shell 174.

In FIG. 18 the fluid has advanced through the circular passageway 77 of the metering assembly 76 and has now moved to the position shown by the arrow 0 in FIG. 14. As the fluid moves through the circular passageway 77, it forces the wobble disc 78 to nutate into the position shown in this Figure. The drive pin 162 has now advanced 180° from the start position shown in FIG. 16 and is tilting toward the letter C in FIG. 5. The signal generator disc has likewise advanced 180° in a clockwise rotation from the original position shown in FIG. 16.

In FIG. 19 the wobble disc 78 has advanced 270° from the initial start position shown in FIG. 16. The drive pin 162 is inclined toward the letter D in FIG. 5. The fluid has now advanced through the internal circular passageway 77 of the metering assembly 76 as shown by the flow arrow P in FIG. 14.

As the fluid continues to advance through the circular internal circular passageway 77 it impacts the stabilizing vane 184 as shown by the flow arrow Q in FIG. 14. The fluid is forced through the holes 234 and 236 in the bottom shell 176 as indicted by the flow arrow R. Fluid likewise exits the internal circular passageway 77 through the holes 194 and 196 in the top shell 174.

As the fluid exits the outlet port 82, it forces the wobble disc 78 to continue to nutate and to return to the start position originally shown in FIG. 16 which likewise causes the signal generator disc 94 to complete a 360° rotation in the central chamber 14. For each revolution of the signal generator disc 94, ten slugs will pass under the pickup coil 170. As fluid continues to flow through the flow meter 1, the wobble disc 78 continues to nutate thus driving the signal generator disc 94 in a continuous clockwise direction as long as fluid is flowing through the metering assembly 76. At maximum flowrates of 20 gpm, the signal generator disc 94 may be rotating at approximately 1200 rpm.

The complete flow path of the fluid is as follows. Fluid enters the flow meter 1 through the inlet port 26. The fluid then passes through the inlet port 80 of the metering assembly 76. As the fluid enters the metering assembly it impacts the stabilizing vane 184 as shown by the flow arrow M in FIG. 14. The stabilizing vane 184 acts as a wall which isolates the inlet 80 from the outlet 82 and together with the top shell 174 and the bottom shell 176 define the interior circular passageway 77 of the metering assembly 76. The fluid then flows through the internal circular passageway 77 in the metering assembly 76, as generally indicated by the flow arrows N, O, and P in FIG. 14. As the fluid passes through the internal circular passageway 77 in the metering assembly 76 it causes the wobble disc 78 to nutate as shown in FIG. 16, 17, 18 and 19. The fluid then encounters the stabilizing vane 184 as shown by the flow arrow Q in FIG. 14. The fluid is then forced to exit the internal circular passageway 77 through the holes 234 and 236 in the bottom shell 176 and the holes 194 and 196 in the top shell 174. The fluid then enters the central chamber 14 and passes out of the flow meter 1 through the outlet port 28.

As fluid passes along this flow path, the wobble disc 78 nutates in the internal circular passageway 77 of the metering assembly 76. The nutation of the wobble disc 78 causes the drive pin 162 to rotate in a circular arc which drives the signal generator disc, causing it to be rotated in a clockwise direction as long as fluid is flowing through the flow meter 1. When the fluid flow stops through the flow meter 1, the wobble disc 78 ceases to nutate and the signal generator disc 94 stops rotation.

Figure 20:
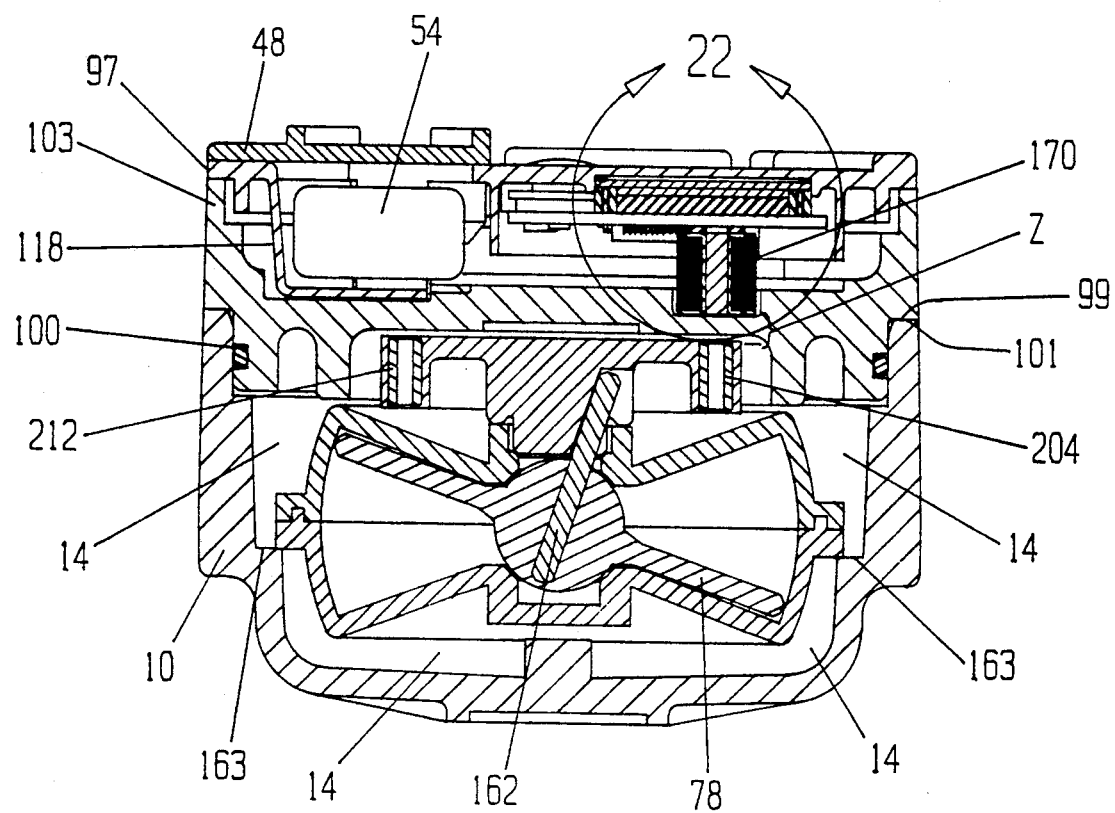
FIG. 20 is a section view of the electronic nutating disc flow meter along the line 20—20 of FIG. 2.

FIG. 20 is a cross-section of the electronic nutating disc flow meter 1 along the line 20—20 of FIG. 2. In this figure, the nutating disc 78 and the drive pin 162 are positioned at the same angle as shown in FIG. 19. In other words, the drive pin is advanced 270 from the initial start position as shown in FIG. 16. A ferrous slug 204 is positioned immediately below the pickup coil 170. This sensor means 170 sends a signal each time one of the ferrous slugs passes underneath the sensor 170. In other words, when the signal generator disc 94 has made one complete revolution, each of the ferrous slugs will have passed under the pickup coil 170 once and the sensor will accordingly have sent 10 signals or pulses as each of the ferrous slugs has passed underneath the sensor 170.

Figure 21:
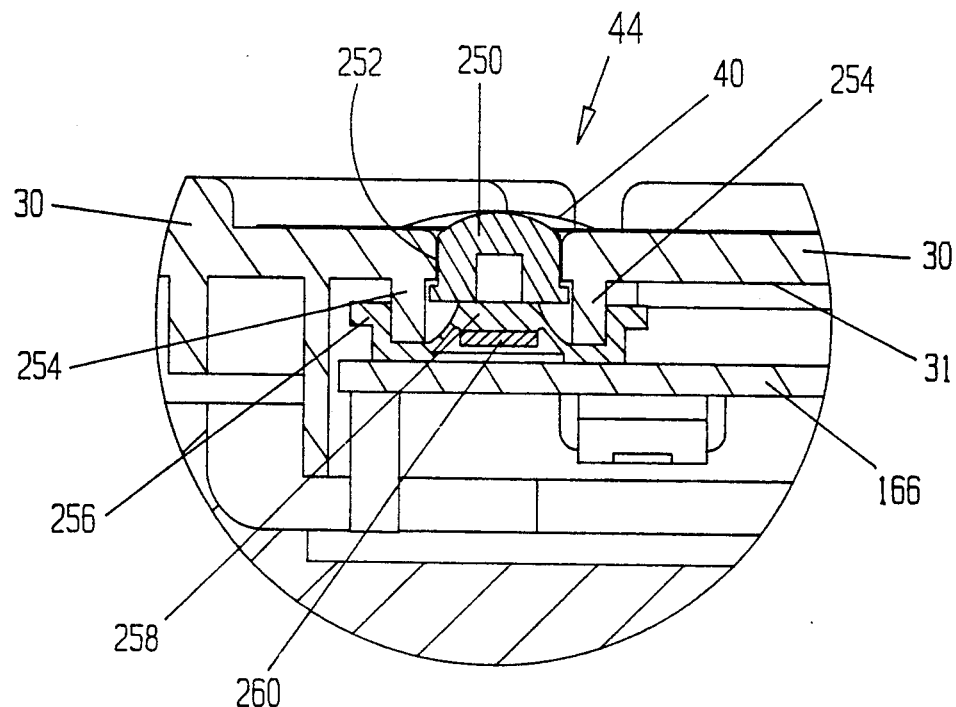
FIG. 21 is an enlarged section view of the dome switch taken from FIG. 18.

FIG. 21 is an enlargement of the first dome switch 44, taken along the line 21 of FIG. 18. As previously discussed, there are two dome switches mounted in the faceplate 30 which are identical in structure. The first dome switch 44 is identified by the phrase "Display" on the decal 40. The second dome switch, generally identified by the numeral 46, is identified by the term "Calibrate" on the decal 40. A circular plastic plunger 250 is positioned in a circular aperture 252 in the faceplate 30 underneath of the decal 40. The plastic plunger 250 is free to move up and down within the circular aperture 252 in response to finger pressure on the decal 40. On the reverse side 31 of the faceplate 30 there is a circular protrusion 254. An elastomer cap 256 is sized and arranged to fit around the circular protrusion 254. The elastomeric cap 256 has an internal cone 258 which tends to urge the plunger 250 into an upward position as shown in the drawing. Attached to the bottom of the cone 258 is a circular carbon contact 260. Beneath the contact 260 is the circuit board 166. As shown in FIG. 21, the first dome switch 44 is in the open position. If the operator wishes to close the first dome switch he puts his finger over the decal 40 and pushes the plunger 250 downward which depresses the cone 258 causing the carbon contact 260 to engage two contacts on the circuit board 166 thus closing the circuit. The second dome switch 46 is identical in structure to the first dome switch 44 previously described. Those skilled in the art will readily understand and recognize the operation and features of these two dome switches.

Figure 22:
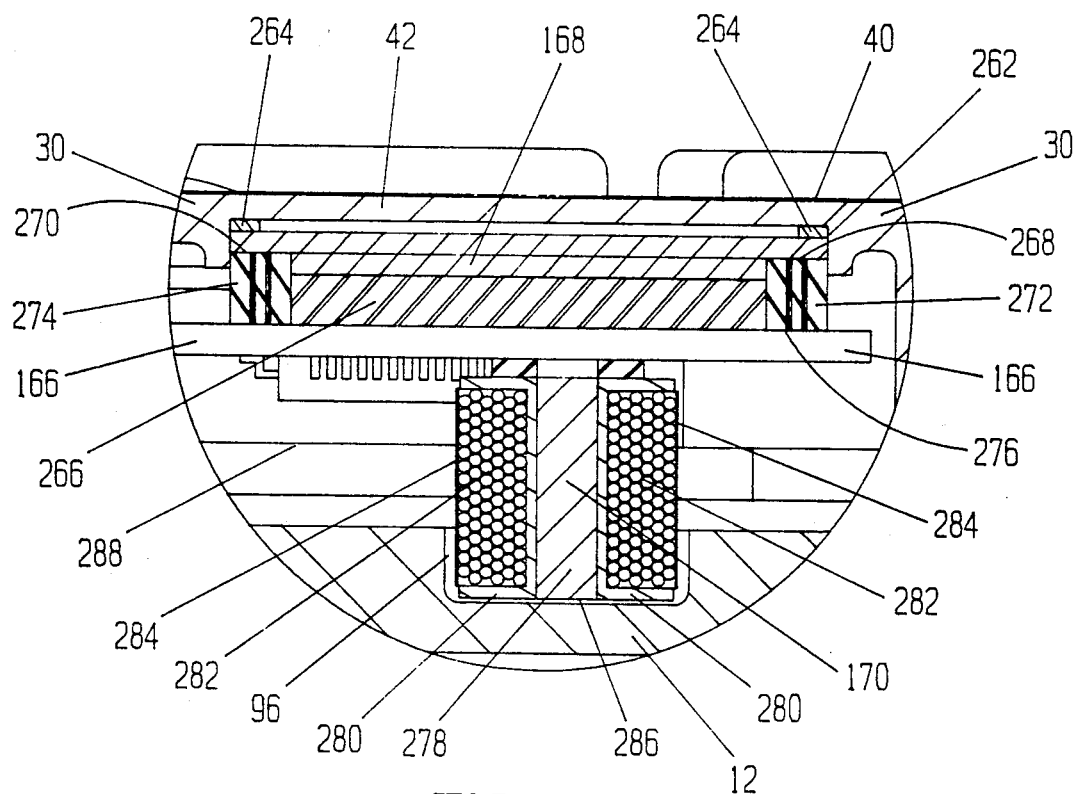
FIG. 22 is an enlarged section view of the liquid crystal display and pickup sensor taken from FIG. 20.

FIG. 22 is an enlargement along the line 22 of FIG. 20. The liquid crystal display (LCD) 168 and the operation thereof are known to those skilled in the art and will not be repeated herein for the sake of brevity. The LCD 168 is positioned in a rectangular recess 262 formed in the reverse side 31 of the clear faceplate 30. The decal 40 has a clear rectangular window 42 formed therein which allows the operator to observe the LCD 168 through the faceplate 30. An upper rectangular gasket 264 separates the LCD 168 from the recess 262 of the faceplate 30. A backplane gasket 266 supports the bottom side of the LCD 168.

As known to those skilled in the art, the LCD 168 has a plurality of contact points 268 along one edge of the LCD and a plurality of additional contact points 270 along the opposing edge of the LCD 168. The electrical connection between the contact points on the LCD 168 and the circuit board 166 is accomplished by a first elastomeric connector 272 which is sometimes referred to as a Zebra strip and a second elastomeric connector 274. The elastomeric connectors 272 and 274 are known to those skilled in the art and will be described only briefly herein. Running lengthwise through the elastomeric connector 272 is a plurality of conductive fibers 276 which form an electrical connection between the contact points 268 on the LCD 168 and corresponding contact points, not shown, on the circuit board 166. The elastomeric connector 274 has a similar configuration.

The pickup coil 170 will be briefly described. A central cylindrical magnet 278 is secured in a plastic spool 280. The magnet is made of Alnico 8HE material and is fully saturated. Wrapped around the plastic spool 280 is a coil 282 of copper wire. Applicant recommends 6,000 turns of copper wire which is 45 gauge. Wrapped around the exterior circumference of the copper coil is nylon insulating tape 284. The size and strength of this sensor 170 are largely a matter of manufacturing convenience. Other similar sensors of different sizes are within the scope of this invention. The leads to the coil are connected to the circuit board for sending a signal each time a ferrous slug passes underneath the pickup coil 170. After the circuit board 166 has been installed in the faceplate 30, the entire electrical package is potted to approximately the level indicated by the line 288. The potting helps prevent deterioration of the electrical circuit due to moisture and other environmental influences.

Figure 23:
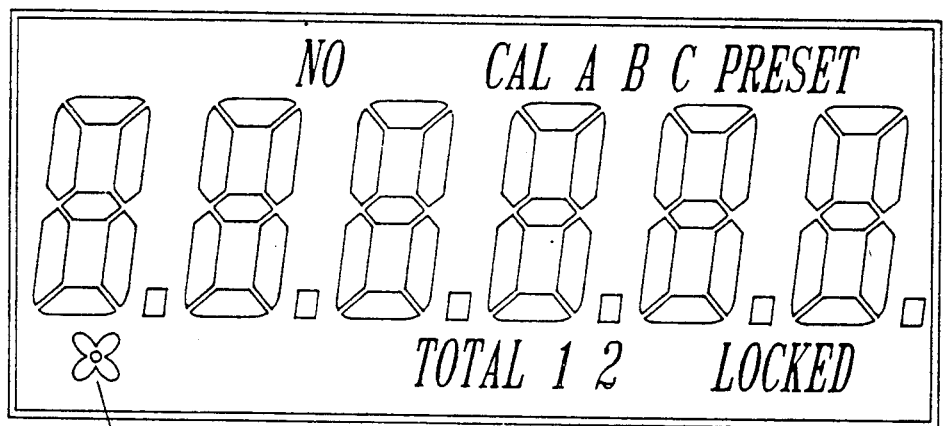
FIG. 23 is an enlargement of the illuminated liquid crystal display of the nutating disc flow meter.

FIG. 23 shows the LCD 168 with all digits and flags fully illuminated solely for purposes of illustration. In actual field operation, the LCD 168 would never fully illuminate all of the digits and flags as shown in FIG. 23.

The LCD 168 will display up to six digits and the decimal will automatically move to the right as required to display large totals. The maximum total digital display using this LCD is "999999". For purposes of illustration, each digit is displaying the number eight and a decimal point is illuminated to read "8.8.8.8.8.8.". Positioned above the row of digits is a row of flags which indicate which calibration curve has been selected, i.e. CAL A, CAL B or CAL C. Positioned below the row of digits is a row of flags which indicate which totalizing register is being displayed, i.e. TOTAL 1 or TOTAL 2.

When not in operation, the electronic nutating disc flow meter 1 goes into a sleep mode which causes the LCD 168 to generate a blank display. The flow meter 1 will wake up when fluid flow begins or anytime the dome switch 44 is actuated. Hereinafter the dome switch 44 will be referred to as the Display button 44. When fluid flow begins through the flow meter 1, a small rotor symbol 300 is illuminated in the lower left hand corner of the LCD 168 The flow meter has two registers or totalizers which accumulate the volume of fluid passing through the flow meter 1. "TOTAL 1" is a batch totalizer that is resettable, and "TOTAL" 2 is a cumulative totalizer that is non-resettable. The batch totalizer is used to determine the total volume of fluid that is being dispensed on a per tank basis. After one tank has been filled, the batch totalizer can be reset to zero before going to the next tank. The cumulative totalizer is non-resettable and measures the total volume of fluid flow through the flow meter 1 from its date of installation until there is a battery change.

The LCD 168 alternates between Total 1, the batch totalizer, and Total 2, the cumulative totalizer. When Total 1 has been selected the LCD will illuminate the following information: "TOTAL 1". When Total 2 has been selected the LCD 168 will display the following: "TOTAL 2 LOCKED". Regardless of which total is being displayed, both totalizers will be operational and will accumulate the volume of fluid which is passing through the flow meter 1. To erase the memory of the batch totalizer, the operator depresses the Display button and holds it for three seconds at which time the display on the LCD 168 will change to zero.

The flow meter 1 has three separate calibration curves for different viscosity fluids. Calibration curve A is for thin viscosity fluids which are less than 9 centipoise. Calibration curve B is for medium viscosity fluids which are approximately 10 to 450 centipoise, like most agricultural herbicides. The calibration points for curve A and B are locked in at the factory and cannot be adjusted by the operator. Calibration C can be field calibrated by the operator. Calibration curve C can be calibrated with one or more data points to establish the parameters of the curve. In order to select calibration A, B, or C, the operator depresses the dome switch 46 which will hereinafter be referred to as the Calibration button. While holding the Calibration button down he momentarily depresses the Display button 44 which causes the LCD 168 to alternate between the calibration curves A, B, or C.

If the operator selects calibration curve A, the LCD 168 will display the following information: "CAL A PRESET"; if the operator selects calibration curve B, the LCD 168 will display: "CAL B PRESET". If the operator selects calibration curve C, the LCD 168 will display: "CAL C". The calibration data is retained during the computer sleep mode and during battery changes.

If the operator decides to field calibrate curve C, the following sequence must be initiated. First, the operator must select curve C as previously described, by depressing and holding the Calibrate button and by momentarily depressing the Display button until the LCD 168 displays "CAL C". Then the operator must depress and hold the Calibrate button 46, and the Display button 44, for three seconds, at which time, the LCD 168 will display on the top line "CAL C", and in place of the numerals it will display "CAL-P0". When the calibrate button 46 and the Display button are released, the LCD 168 will then begin blinking and will display on the top line "CAL C" and in place of the digits "CAL-P1". The flow meter 1 is now ready for loading the first field calibration point. The previous field calibration curve will be erased when the new curve is stored in memory.

If the operator elects to install a one point field calibration curve, the following procedure is utilized. The operator momentarily depresses and releases the Calibrate button 46, which will cause the LCD 168 to quit blinking and display: "CAL-P1". At this time, the operator should fill an accurate five unit container with fluid in one smooth stream. Care should be taken to start and stop the flow quickly. This calibration run should last at least 10 seconds. After dispensing five units, the operator presses and releases the Calibrate button 46. The LCD 168 then blinks "CAL-P2". The first calibration point has now been stored in memory. The operator has now established a one point calibration curve. To exit this procedure, the operator presses and releases the Calibrate button and the Display button simultaneously, at which time the display will return to the digital format.

If the LCD 168 blinks a "no" on the upper line after an attempt to enter a field calibration point, then the procedure was a failure and it must be repeated.

If the operator chooses a multiple point calibration curve with up to five calibration points, the following procedure is used. First the operator selects Calibration curve C, as discussed hereinabove. The LCD 168 will display "CAL-P0" the operator must then press and release the Calibrate button, at which time the LCD 168 will quit blinking and will display "CAL-P1". At this time, the operator should fill an accurate five unit container with fluid in one smooth stream. Care should be taken to start and stop the flow quickly. After the operator has dispensed five units, he must press and release the Calibrate button. The LCD 168 will then blink "CAL-P2". The first calibration point has been stored in memory.

The five unit container must be emptied. The operator must momentarily depress the Calibration button and the display will stop blinking. The meter is now ready to receive its second calibration point. The operator must now adjust the system to a different flow rate and re-fill the aforementioned five unit container with fluid in one smooth stream. After dispensing five units, he must press and release the calibrate button. The LCD will then blink "CAL-P3". The second calibration point has been stored in memory.

The aforementioned sequence can be repeated using different flow rates so that a maximum of five calibration points can be stored in memory. To exit the calibration procedure, the operator presses and releases the Calibrate and Display button simultaneously. The LCD 168 will then return to the numerical format. A blinking "No" indicates a bad calibration, and the procedure must be repeated.

Figure 24:
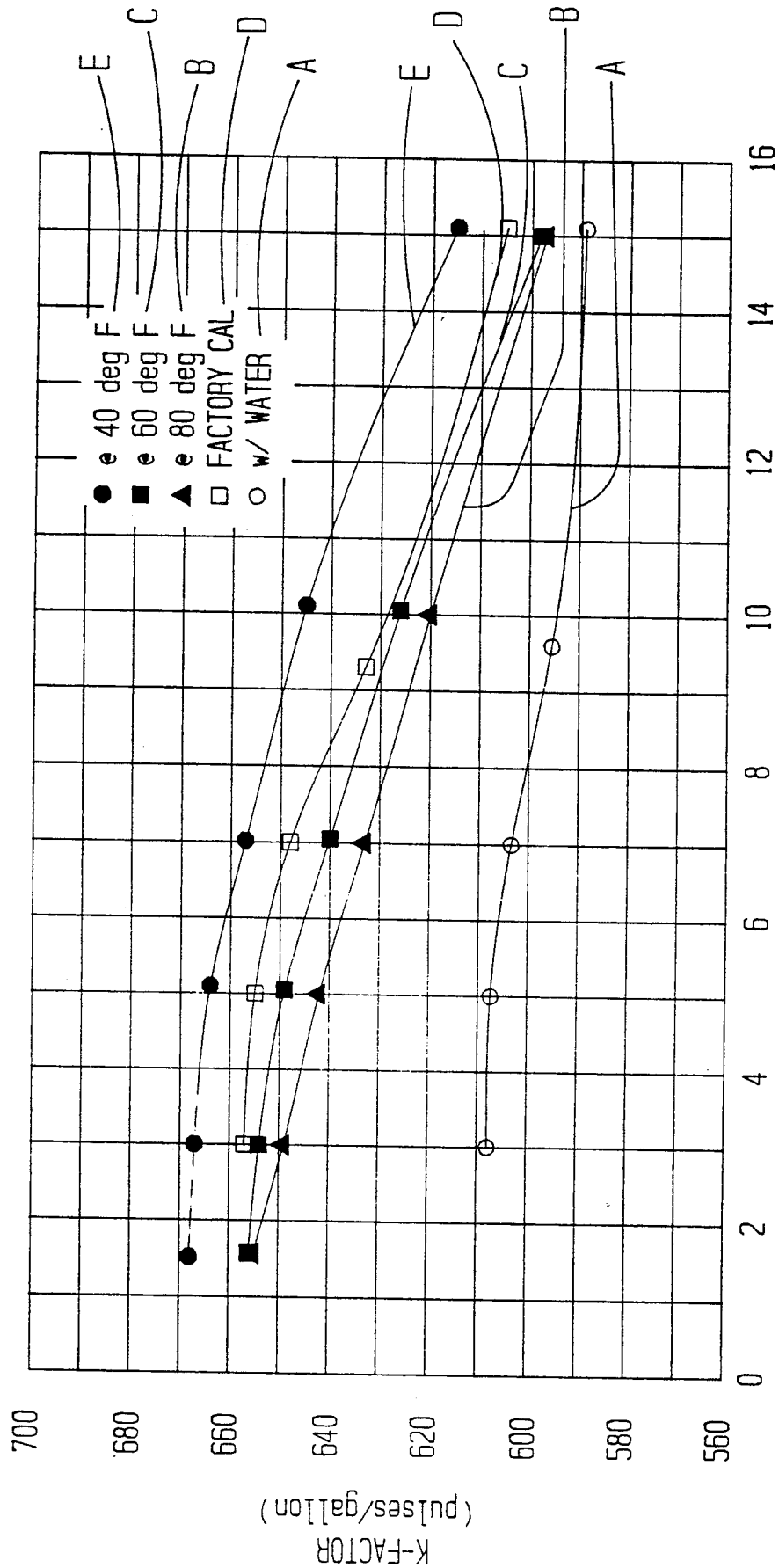
FIG. 24 is a graph plotting K-Factors versus flow rates for a viscous fluid and water passing through the electronic nutating disc flow meter.

FIG. 24 is a graph which plots flow rate in gallons per minute on the horizontal axis and the K-Factor in pulses per gallon on the vertical axis. K-Factor is defined as the number of pulses or signals generated by a meter per gallon of fluid passing through the meter. Curve A is a five point curve for water passing through the flow meter 1. The K-Factor for water various from approximately 590 pulses per gallon, to approximately 610 pulses per gallon, depending on the flow rate through the flow meter 1.

If the operator wished to measure the flow rate of water through the flow meter 1, he should select calibration curve A for thin viscosity fluids. Water has a centipoise of one. Although the flow meter 1 can be used to measure water, Applicants recommend that it be used primarily for medium viscosity fluids such as agricultural herbicides for the greatest degree of accuracy.

Curve E represents Roundup ® herbicide, a Monsanto product, at 40° Fahrenheit. The K-Factor varies from approximately 615 to 670 depending on the flow rate. Curve C represents Roundup ® herbicide at 60° Fahrenheit. The K-Factor likewise varies from approximately 600 to 650 pulses per gallon. Curve B also represents Roundup ® herbicide at 80° Fahrenheit with a K-Factor which varies from approximately 600 to 655 pulses per gallon.

Curves B, C and E are based on empirical test data for the herbicide Roundup ® at various temperatures.

In order to prepare a factory calibration curve for the electronic nutating disc flow meter, Applicants generate a hypothetical curve D which is a rough average between the three actual curves, B, C and E for Roundup ®. If the electronic nutating disc flow meter will be sold to a specific user, who is known to use Roundup ® herbicide as the predominate chemical, factory CAL B will be loaded with the curve D shown on FIG. 24.

If the purchaser or intended user of the flow meter 1 is known to use other specific herbicides, other factory calibration curves can be installed in the flow meter for other specific agricultural chemicals. For example, if the user is known to use Ciba Giegy chemicals, such as Dual ® herbicide, a specific factory calibration curve can be specially loaded for this particular brand of herbicide in CAL B.

Figure 25:
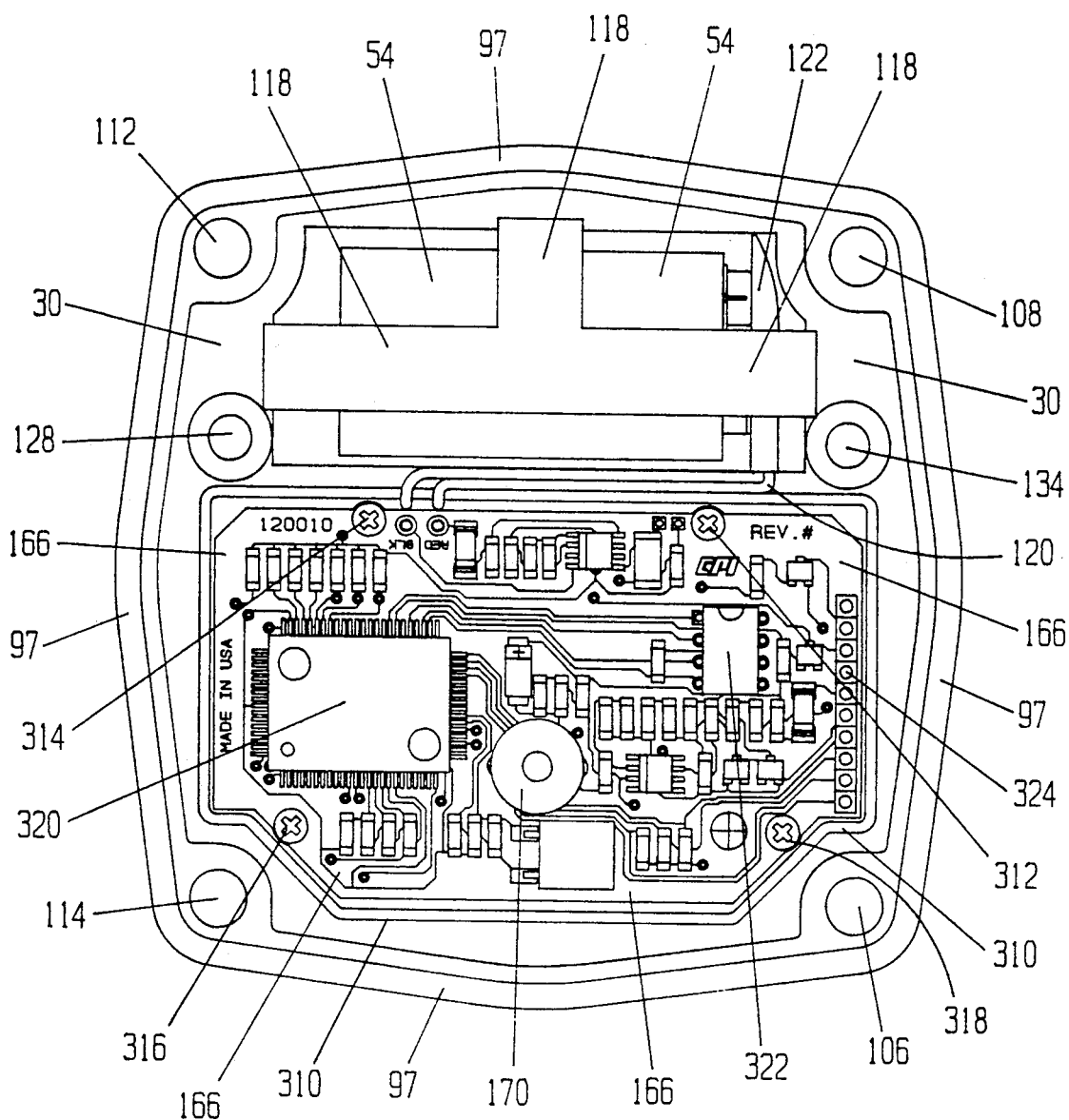
FIG. 25 is bottom plan view of the coverplate with the circuit board attached.

FIG. 25 is a back plan view of the faceplate 30 with the circuit board 166 in place. Along the perimeter of the bottom of the faceplate 30, is a downward facing shoulder 97 which engages an upward facing shoulder 103 formed on the upper perimeter of the coverplate 12. There are four holes, 106, 108, 112 and 114 formed in the faceplate 30 to allow screws to connect the faceplate 30 to the coverplate 12. A first female receptacle 128 and a second female receptacle 134 are formed in the faceplate 30. They respectively receive screws 50 and 52 for securing the battery cover 48 to the faceplate 30. Formed as a integral part of the faceplate 30 is the battery holder 118. The battery 54 is supported in the battery holder 118. The battery 54 connects to a terminal 122 which connects to the circuit board 166 via the connectors 120. A rim 310 protrudes from the reverse side 31 of the faceplate 30. The rim is sized to receive the circuit board 166 which is held in place by screws 312, 314, 316 and 318. The circuit board 166 is approximately three inches in length and two inches in width, weighing less than one ounce with the pickup coil 170, the connectors 120 and terminal 122 in place. This design allows the flow meter 1 to be relatively compact and light weight to facilitate installation adjacent to the dispensing nozzle. After the circuit board 166 has been installed a potting material is poured over the circuit board and is contained by the rim 310 to further protect the circuitry. The pickup coil 170 is tall enough to protrude beyond the level of the potting material.

The microprocessor 320 is positioned on the left hand side of the circuit board 166. Applicant uses a Mitsubishi M50930, an 8-bit, single-chip CMOS microprocessor. It has 4096 bytes of permanent memory in the ROM (Read Only Memory) and 128 bytes of memory in the RAM (Random Access Memory). The main operating program, the permanent memory and all programing instructions are permanently burned into the ROM. The RAM contains the background totalizer, the batch register, the cumulative register and generally performs all mathematical calculations using the formulas which will be described herein. A EEPROM 322 is mounted on the right side of the circuit board (electrically erasable programmable read only memory). To the far right of the circuit board is EEPROM programming interface connection 324 which allows the factory to program the EEPROM as desired.

After each flow meter 1 has been manufactured it is placed on a ballistic calibrator in the factory for testing. Due to manufacturing tolerances each individual unit varies slightly from other units previously manufactured. Testing on the ballistic calibrator allows the factory to electronically adjust and compensate for these manufacturing differences.

At the end of the production line is a ballistic calibrator. After each unit comes off the production line, it is placed on the ballistic calibrator and Stoddard brand solvent, which approximates water, is pumped through each electronic nutating disc flow meter. The ballistic calibrator empirically determines a five point K-Factor curve for each specific unit based on the amount of solvent which is pumped through the flow meter. This five point K-Factor curve is loaded onto a floppy disc. This disc is transferred to a personal computer which is connected to a translation station which connects to the EEPROM programming interface 324.

This special five point curve would be ideal for a specific fluid, such as Stoddard brand solvent or water, both of which have a low viscosity, i.e. 1 or 2 centipoise. This specific curve is acceptable, but not ideal for the entire range of thin viscosity fluids, i.e. 1 to 9 centipoise. To improve accuracy, the curve which has been empirically determined on the ballistic calibrator is altered, by a ratio, to a curve that better approximates a range of fluids between 1 to 9 centipoise. This altered curve is loaded in to the EEPROM as CAL A for thin viscosity fluids of less than 9 centipoise.

The empirically derived curve is altered a second time by a different ratio, to a curve that better approximates a range of fluids between 10 to 450 centipoise. This altered curve is into the EEPROM as CAL B for medium viscosity fluids of 10 to 450 centipoise.

It has been determined that for a given unit the difference between the K-Factor curve for Stoddard brand solvent, and the K-Factor curve for thin viscosity fluids and the K-Factor curve for medium viscosity fluids varies by a typical offset or ratio curve. The personal computer has in its memory a series of offset values for the thin viscosity fluid range and a different set of offset values for the medium-viscosity fluid range. This information may sometimes be referred to as the Calibration Curve Offset Table. This data could be empirically derived by one skilled in the art for this or other designs.

For standard production this personal computer selects offset data from the Calibration Curve Offset Table, as appropriate for the thin-viscosity fluid range, and uses the offsets to modify the empirically-derived K-Factor curve from the ballistic calibrator. This yields a calculated, modified cal curve appropriate for the thin-viscosity fluid range, which curve is then programmed into the EEPROM of the electronic nutating disc flow meter, as previously described, as the standard production CAL A. This electronic adjustment sequence allows the factory to correct for slight manufacturing differences between each individual unit.

In addition, for standard production, the personal computer selects offset data from the Calibration Curve Offset Table, as appropriate for medium-viscosity fluid range, and uses the offsets to modify the empirically-derived K-Factor curve from the ballistic calibrator. This yields a calculated, modified cal curve appropriate for said medium-viscosity fluid range, which curve is then programmed into the EEPROM of the electronic nutating disc flow meter, as previously described, as the standard production CAL B. This electronic adjustment sequence allows the factory to correct for slight manufacturing differences between each individual unit.

The computer also has various sets of data for specific brands of thin viscosity fluids or medium viscosity fluids for custom programming. For example, there is a data table for Avadex BW ® brand herbicide, a Monsanto product and another data table for ERADICANE EXTRA ® brand herbicide, an ICI product, both of which are thin viscosity fluids. For custom production, the personal computer selects offset data from the Calibration Curve Offset Table, as appropriate for a specific brand of thin viscosity fluid, and uses the offsets to modify the said empirically derived K-Factor curve from the ballistic calibrator. This yields a calculated, modified cal curve appropriate for the specific brand of thin viscosity fluid, which curve is then programmed into the EEPROM of the electronic nutating disc flow meter, as previously described, as custom CAL A. This electronic adjustment sequence allows the factory to correct for slight manufacturing differences between each individual unit.

In addition, for custom programming, the personal computer selects offset data from the Calibration Curve Offset Table, as appropriate for specific brands of medium viscosity fluid, and uses the offsets to modify the empirically derived K-Factor curve from the ballistic calibrator. For example, there is a data table for Roundup ® brand herbicide, a Monsanto product, another for Dual ® brand herbicide, a Cibi Giegy product, etc. This yields a calculated, modified cal curve appropriate for the specific brand of medium viscosity fluid, which curve is then programmed into the EEPROM of the electronic nutating disc flow meter, as previously described, as custom CAL B. This electronic adjustment sequence allows the factory to correct for slight manufacturing differences between each individual unit for specific fluids.

It is also within the scope of this invention to load into the EEPROM various custom curves such as a thin viscosity calibration without a medium viscosity calibration, a medium calibration without a thin viscosity calibration, multiple thin viscosity calibrations, or multiple medium viscosity calibrations. The advantage is better accuracy.

Figure 26:
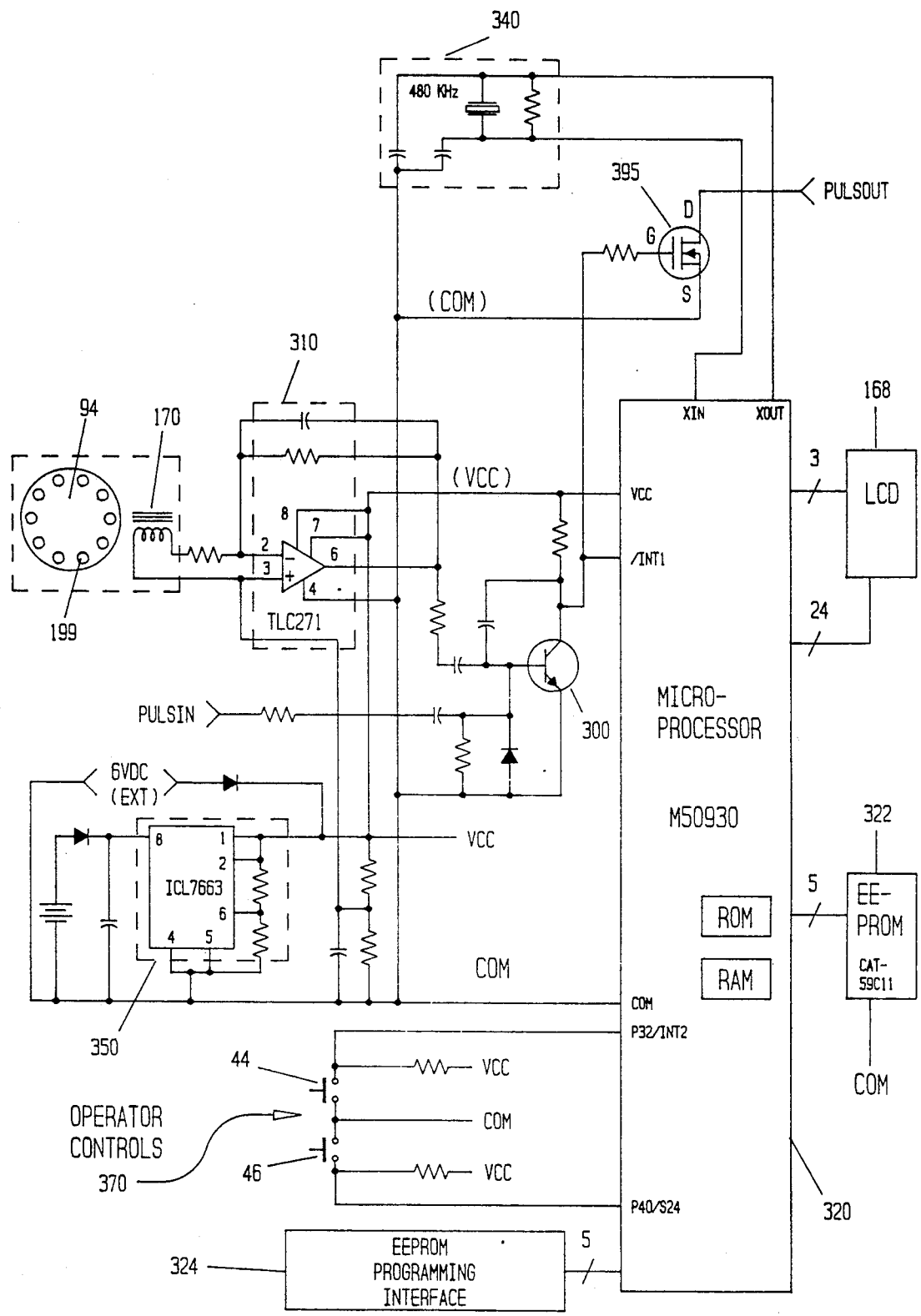
FIG. 26 is a partial block diagram, in schematic form, illustrating the electronics of the electronic nutating disc flow meter.

Referring to FIG. 26, a partial block diagram in schematic form illustrating the electronics of the flow meter 1 according to the invention is illustrated. A signal generator disk 94 having a plurality of ferrous slugs 199 therein is positioned in the central chamber 14. Signal generator disk 94 is rotated by movement of the fluid through the flow meter inducing a sensing signal in pickup coil 170 each time a slug 199 passes in proximity to the coil 170. Amplifier 310 amplifies and filters the sensing signal generated by coil 170 and uses the amplified signal to control the operation of a bi-polar transistor 320. In particular, bi-polar transistor 320 is switched on and off in response to detection or no detection of a ferrous slug 199 by coil 306 in order to provide a square wave pulse to a microprocessor 320 having either a value of six volts (VCC) when a slug 199 is in proximity to the coil 306 and zero volts when no slug is present.

System oscillator 340 generates an oscillating signal which is used as a clock to drive microprocessor 320 as well as used by the other circuits for timing. The microprocessor 320 is driven by a voltage regulator 350 which provides a constant system voltage VCC for driving the microprocessor 320. This microprocessor periodically drives the EEPROM 322. EEPROM 322 includes information such as lookup tables, algorithms or other information which defines the relationship between a K-factor and its corresponding flow rate. This information is programmed at the factory prior to installation. Operator controls 370 including first dome switch 44, hereinafter display button, and second dome switch 46, hereinafter calibrate button, are used by the operator to control the display, calibration or other operation of the flow meter 1 according to the invention. In addition, an EEPROM programming interface 324 may be provided to permit external calibration or control of microprocessor 320 and to permit additional information to be dumped or otherwise programmed into EEPROM 322. Additionally, the system includes a liquid crystal display 168 driven by microprocessor 320 for indicating to the operator either information relative to the programming operations which are occurring or the present flow rate or batch flow rate. Microprocessor 320 includes drivers for controlling the display of LCD 168. Optionally, the electronics may be provided with an input (PULSIN) for externally inputting sensing signals to the bipolar transistor 320 and an FET 395.

The flow meter 1 is designed to ensure that the microprocessor 320 operates at a low power level. This allows use of a small 9 volt transistor battery while maintaining adequate battery lifetime.

The CMOS (Complementary Metal Oxide Silicon) circuitry power requirements as used in the Mitsubishi microprocessor 320 and operational amplifier 310 are known to be a small fraction of that of comparable ENMOS (N-Channel Metal Oxide Silicon) or bipolar circuitry (1/100 typical). CMOS circuitry also allows the use of relatively high-value resistors for pull-up and similar functions, thereby further reducing the system's overall power requirements. The flow meter 1 takes full advantage of CMOS circuitry including the use of a CMOS microprocessor 320 and operational amplifier 310.

All microprocessor based circuits require the presence of a clock signal which is a high-frequency signal used to keep all of the microprocessor's internal functions synchronized. A typical clock frequency for the Mitsubishi microprocessor 320 would be 4 MHZ. The flow meter 1 uses a lower frequency of 480 KHz, while still maintaining adequate operating characteristics. Supply current is reduced accordingly.

The CMOS Mitsubishi microprocessor 320 has special operating modes which help to achieve power reduction (this is not unique to Mitsubishi; microprocessors from other vendors often have similar modes). These modes are called the "WAIT" mode and the "STOP" mode. In these modes, certain normal operating functions of the microprocessor 320 are switched off, thus reducing power usage.

The STOP mode is the more drastic of the two, since essentially all functions are halted. This includes the clock, the LCD, the timers, and all instruction processing. The STOP mode reduces power consumption, from normal operation, by a factor of over 100. The microprocessor 320 invokes STOP mode when the flow meter 1 is in the sleep state.

The WAIT mode is an intermediate mode, during which only instruction processing is stopped; the display, clock, and timers continue in normal operation. The WAIT mode reduces power consumption, from normal operation, by a factor of about 10.

It is important to understand that both of these reduced-power modes are programmable, which means that careful program design will maximize their effectiveness. STOP mode is automatically invoked if the flow meter 1 is inactive for a period of time exceeding five minutes (the unit falls "asleep").

Figure 27:
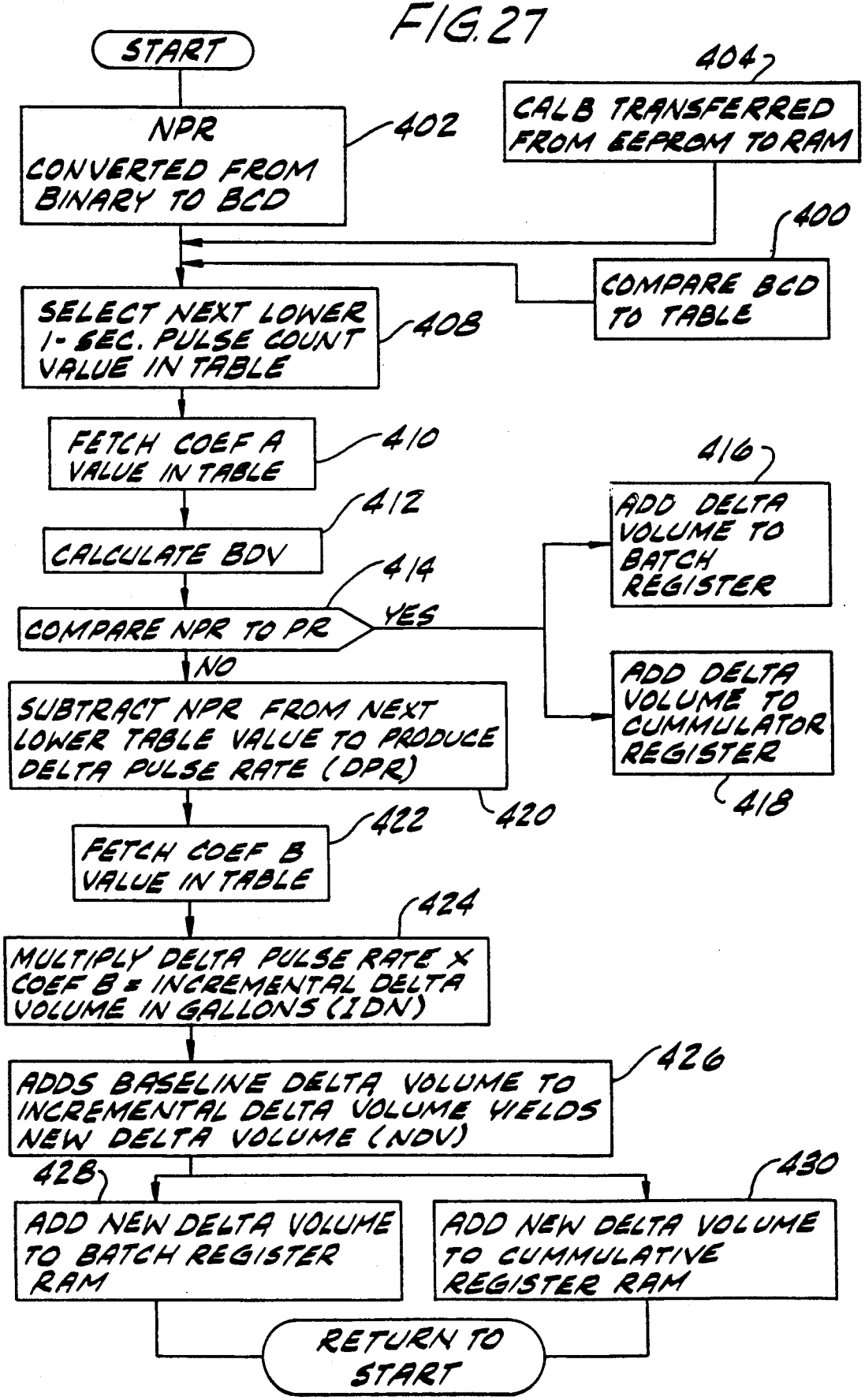
FIG. 27 illustrates the steps employed by the microprocessor when calculating volume in the electronic nutating disc flow meter.

The WAIT mode is intermingled with normal operation in such a way that WAIT mode is invoked during all times when the unit is not actually doing foreground processing as shown in FIG. 27. Thus there will typically be about a 40% duty cycle, i.e., full power mode is used about 40% of the time, with WAIT mode taking the remaining 60%.

Use of an EEPROM 322 is desirable in a flow meter to retain calibration data and other seldom-changed customization parameters, but there is a power-consumption penalty. The EEPROM 322 used in the flow meter 1 is manufactured by Catalyst Semiconductor, Inc. of Santa Clara, Calif. and is a model CAT59C11 although other brands of EEPROM may be suitable and are within the scope of this invention. This EEPROM 322 is rated by the manufacturer to consume a normal operating current of as much as 5 milliamperes. This is a large current for a battery powered system and would reduce battery life if energized on a continual basis.

However, the microprocessor 320 does not need to consult the EEPROM 322 on a continuous basis. The program supplies power to the EEPROM 322, only for brief intervals when access is actually required The EEPROM 322 is powered for just under 0.5 second out of each 60 seconds. This is a duty cycle of about 0.8% which means that instead of 5 milliamperes, the EEPROM 322 imposes an extra burden of only about 0.04 milliamperes (normally even less, since the manufacturer's rating is usually conservative).

CALCULATION OF VOLUMETRIC FLUID FLOW

As previously discussed, the present invention has two K-Factor curves which are factory loaded and permanently stored in the memory of the EEPROM 322; CAL A is for thin viscosity fluids and CAL B is for medium viscosity fluids. In FIG. 24, curve D is the factory curve which is loaded in the EEPROM for the herbicide Roundup ®. This specific herbicide is relatively viscous and is approximately 175 centipoise at 60° F. Other K-Factor curves can be loaded into the EEPROM at the factory as CAL B, depending on the intended use of the flow meter 1. For example, if the factory knows that the intended user of the flow meter 1 typically applies Dual ® herbicide to his crops, a K-Factor curve can be loaded which is specific for this brand. If the intended use is unknown, a generic K-Factor curve is loaded as CAL B at the factory.

The following example will explain how the microprocessor 320 calculates volumetric fluid flow. This example will use the K-Factor curve D of FIG. 24 and assumes that it has been factory loaded into the EEPROM as CAL B.

Referring to FIGS. 26 and 27 the process executed by microprocessor 320 according to the invention will be described. The steps described in block diagram 27 may sometimes be described as foreground processing. The accumulation of pulse counts during a one second period of time in the background totalizer may sometimes be described as background processing. Initially, the following data is factory loaded into the EEPROM 322 for purposes of calculating flow volume.

TABLE 1

| CAL B K-Factor Data Table | | | |
|---|---|---|---|
| CAL RUN # | PR(p/s) | COEFA (g/p) | K-Factor (P/g) | COEFB (g/p) |
| 1 | 32.9 | .00152 | 657 | .0000252 |
| 2 | 54.6 | .00153 | 655 | .000036 |
| 3 | 75.6 | .00154 | 648 | .000159 |
| 4 | 101.0 | .00158 | 633 | .000209 |
| 5 | 152.0 | .00165 | 605 | .000000 |

First, the operator must select CAL A, CAL B or CAL C by using operator controls 370. In this example, CAL B has been selected. The data in Table 1 is transferred from the EEPROM 322 to the RAM in the microprocessor 320. In order to calculate the volume of fluid flowing through the electronic nutating disc flow meter, the following formula is used:

$$NVD = [(NPR \times COEFA(b)) + (DPR \times COEFB(b))]$$

NDV is the new value of the delta volume which is added at one second intervals to the batch register and the cumulative register within the RAM. NPR is the new pulse rate in pulses per second. COEFA(b) is a coefficient selected from Table 1 under the column listed COEFA. DPR is the delta pulse rate in pulses per second. COEFB(b) is a coefficient selected from Table 1 under the column COEFB. The K-Factors are the five calibration points on curve D of FIG. 24.

In FIG. 26, the new pulse rate (NPR) is generated at one second intervals. The signal generator disc 94 will be spinning in a clockwise direction as liquid is passing through the flow meter 1. The pickup coil 170 sends out a signal each time one of the ferrous slugs 199 passes underneath the sensor 170. The signal produced by the pickup coil 170 is in the neighborhood of 20 to 25 millivolts, and is transferred to an operational amplifier 310 were the signal is boosted to approximately five volts. The operational amplifier 310 also filters out high frequency signals for greater accuracy. The operational amplifier 310 generates a signal which selectively drives bipolar transistor 300 as a switch which, when closed, applies VCC to pin 27/INT1 to microprocessor 320 to generate pulses each time a slug 199 is detected by sensor 170. The pulses are then accumulated in a background totalizer in the RAM in the microprocessor 320. The microprocessor 320 has a clock which measures time in one half second increments. The new pulse rate (NPR) is the total number of pulses accumulated in the background totalizer for a one second period of time.

The batch register and the cumulative register in the RAM use BCD numbers (Binary Coded Decimals) whereas the background totalizer uses binary numbers.

The microprocessor 320 calculates a new delta volume (NDV) each second while fluid is flowing through the flow meter 1 using the aforementioned formulae and automatically adds the new delta volume to the batch register and the cumulative register each second, thus providing real time information to the operator. The operator therefore will observe the amount of liquid that is actually flowing through the dispensing nozzle on the LCD 168. The value on the LCD 168 will change at one second intervals and will be incrementally increased as a new delta volume is added to the batch register and the cumulative register.

In order to better understand how the new delta volume is calculated, the following examples will be given. Assume a new pulse rate (NPR) of 60. This is generated as indicated in FIG. 26 by the signal generator disc 94 which rotates in a clockwise fashion as fluid passes through the flow meter 1. The signal is sensed by the pickup coil 170, it is amplified and filtered, and accumulated in the background totalizer as a binary number for a one second period of time. The new pulse rate is converted into binary coded decimals in the foreground totalizer in the RAM by step 402. The data in Table 1 has been previously transferred by step 404 from the EEPROM 322 to the RAM for this calculation sequence by selection of CAL B, by the operator by using the operator controls 370. Assuming that NPR equals 60, the microprocessor 320 will determine that this pulse rate is bracketed between calibration point two and calibration point three in Table 1. The program will then select at step 408 the next lower one second pulse count value (PR) which in this case is 54.6. At step 410, microprocessor 320 executes the program to then fetch or lookup COEFA(b) from the Table, which in this example is 0.00153. The microprocessor 320 will then calculate the baseline data volume (BDV) at step 412 by multiplying the NPR times COEFA(b) which in this case will be 60×0.00153=0.0918. At step 414, microprocessor 320 compares the NPR to the PR to determine if the NPR is exactly the same as a table pulse rate (PR). In this example, the NPR is 60 and there is no identical pulse rate (PR) in Table 1. However, if the new pulse rate (NPR) had been identical to a pulse rate of the table, the product (0.0918) which is a base line delta volume, and would be incrementally added to the batch register by step 416 and to the cumulative register by step 418 in the RAM. Obviously, the NPR does not equal the PR in very many situations.

Continuing with the example, if step 414 determines that the NPR is not equal to one of the pulse rates (PR) in the data table the microprocessor 320 executes step 420 and subtracts the next lower table value from the NPR to produce a delta pulse rate, i.e. 60−54.6=5.4. The program will then execute step 422 to fetch or lookup the corresponding coefficient B from the data table which in this case is 0.00036. The program then executes step 424 and multiples the delta pulse rate times coefficient B to yield the incremental delta volume in gallons. The microprocessor 320 then adds the base line delta volume to the incremental delta volume which yields the new delta volume at step 426. The new delta volume is added to the batch register at step 428 and to the cumulative register at step 430. The process then returns to start so that it occurs once each second, therefore providing the operator with real time data concerning the volume of fluid dispensed through the flow meter 1. In our example, this takes on the following values, assuming NPR=60:

$$NDV = [(NPR \times COEFA(b)) + (DPR \times COEFB(b))]$$

$$NDV = [(60 \times 0.00153) + (5.4 \times 0.00036)]$$

$$NDV = 0.0918 + 0.00194]$$

$$NDV = 0.09374 \text{ gal.}$$

In this example, 0.09374 gallons will be added to the batch register and the cumulative register in the RAM which will display the new volume on the LCD 168.

When the battery is changed all data in the RAM is lost. The batch register and the cumulative register in the RAM therefore go to zero when the batteries are changed. The calibration curve data is stored in the EEPROM 322 and is not lost when the batteries are changed.

FIELD CALIBRATION TECHNIQUES

As previously noted, the present flow meter 1 can be field calibrated with up to five points on the calibration curve. Fewer than five points may be installed, but this example will assume five complete points are loaded to define the curve. The desired result of the multi-point calibration procedure is a data table similar to the aforementioned Table 1.

In order to do a field calibration, the operator must first locate a five gallon calibration container for dispensing the liquid in question. If the operator wishes to use liters as a standard of measure, he must obtain a five liter calibration container. Any other unit of measure can be used, at the operator's discretion. In this example, the operator will be using a five gallon calibration container.

In order to do the field calibration, the operator must fill the five gallon calibration container using a steady flow rate. The total number of pulses (TP) will be accumulated in a register in the RAM. In this example the first field calibration run will be 3,025 pulses per five gallon container. The memory will also record the total number of seconds necessary to fill the five gallon container for this first calibration point.

The container will then be emptied and the operator will refill the container using a different flow rate. The total pulses for the second calibration point in this example is 3,285.

The calibration container will be emptied and refilled at a third flow rate yielding a total pulse rate of 3,165 for the third calibration point. The field calibration container will then be emptied.

The operator will then refill the five gallon calibration container using a different flow rate which yields a total pulse count of 3,275 in this example. The calibration container will then be emptied.

Finally, the operator will refill the five gallon calibration container using a different flow rate which produces a total pulse count of 3,240. These field calibration points can be arrayed into a data table as follows:

TABLE 2

Raw Field Calibration Data

| FIELD CAL RUN # | TP (p/5 gal.) | Sec. to Fill 5 Gal. | PR PULSE RATE (p/s) | K-FACTOR (p/gal) |
|---|---|---|---|---|
| 1. | 3025 | 19.9 | 152.0 | 605 |
| 2. | 3285 | 99.8 | 32.9 | 657 |
| 3. | 3165 | 31.3 | 101. | 633 |
| 4. | 3275 | 59.9 | 54.6 | 655 |
| 5. | 3240 | 42.8 | 75.6 | 648 |

TP = Total pulses necessary to fill the five gallon container. This is the raw data generated by the field calibration.
PR = total pulses (TP) divided by total seconds necessary to fill 5 gal. container.
K-Factor = total pulses divided by five gallons.

The pulse rate (PR) is calculated by dividing the total number of pulses (TP) necessary to fill the five gallon container by the total second necessary to fill the five gallon container producing the pulse rate (PR) in pulses per second. The microprocessor 320 has a clock which measures the number of seconds necessary to fill each five gallon container. The elapsed time for each calibration run is stored in memory.

The K-Factor is calculated by dividing the total pulses (TP) by five gallons producing the K-Factor in pulses per gallon. These calculations are accomplished in the RAM.

The multiplying constant (hereinafter referred to as COEFA) is expressed in gallons per pulse and the correcting constant (hereinafter referred to as COEFB) is expressed in gallons per pulse. It should be noted that the multiplying constant, COEFA, as used in the following tables is the inverse of what is generally called the "K-Factor". Considering a typical x-y plot of a K-Factor curve, essentially COEFA defines the absolute y-value of a CAL point and COEFB defines the slope of a straight line segment to the right of the point.

The microprocessor 320 will now sort the pulse rate (PR) into ascending order and will calculate coefficient A (COEFA) yielding the following data:

TABLE 3

Sorted Field Calibration Data

| Sorted CAL Run # | PR(p/s) | COEFA(g/p) |
|---|---|---|
| 1. | 32.9 | .00152 |
| 2. | 54.6 | .00153 |
| 3. | 75.6 | .00154 |
| 4. | 101.0 | .00158 |
| 5. | 152.0 | .00165 |

COEFA = five gallons divided by total pulses (TP).

COEFB will be calculated using the following formula:

Formula for Calculating COEFB $$COEFB(n) = \frac{[(PR(n+1) \times COEFA(n+1)) - (PR(n+1) \times COEFA(n))]}{[PR(n+1) - PR(n)]}$$

In this formula PR is the pulse rate in pulses per second shown in Table 2. COEFA has been previously calculated and is also shown in Table 2. "n" now identifies the sorted CAL run number. Thus the first COEFB is calculated as follows assuming a PR of 32.9:

First COEFB

| COEFB (n) = | [(54.6 × .00153) − (54.6 × .00152)] | / | [54.6 − 32.9] |
|---|---|---|---|
| | [.083538 − .082992] | | 21.7 |
| | .000546 | / | 21.7 |
| COEFB (n) = | .00002516129 | | |

The COEFB for CAL run 2, 3 and 4 is calculated in a similar fashion. It is impossible to calculate COEFB for CAL run 5 so it is assigned the number zero. The resultant information is the data shown in Table 1. This field calibration data is now designated CAL C and is transferred to memory in the EEPROM 322.

In actual practice, it would be duplicitous to install a field calibration which was identical to a pre-loaded factory calibration. This illustration used the same liquid for factory CAL B and field CAL C merely for the sake of clarity.

While the foregoing is directed to the preferred embodiment of the present invention, other and further embodiments of the invention may be devised without departing from the basic scope thereof, and the scope thereof is determined by the claims which follow.

What is claimed is:

1. An electronic nutating disc flow meter for measuring volumetric fluid flow comprising:
   a. a housing defining a central chamber, said housing having an axially aligned inlet and outlet to permit fluid communication with said central chamber, said housing formed from a composite material;
   b. a metering assembly including a wobble disc positioned in said central chamber, said metering assembly defining an internal circular passageway having an inlet and an outlet, said inlet of said metering assembly in fluid communication with said inlet of said housing and said outlet of said metering assembly in fluid communication with said central chamber of said housing, said wobble disc having a protruding drive pin extending through an aperture in said metering assembly;
   c. a free floating signal generator disc positioned in said central chamber between said metering assembly and said housing, said signal generator disc formed from a composite material having a friction reducing component and including a plurality of ferrous, non-magnetized slugs positioned about the circumference, said signal generator disc engaging and being rotated by said drive pin as the fluid passes through the electronic nutating disc flow meter along the following flow path: fluid enters through said inlet of said flow meter and passes into said inlet of said metering assembly through said internal passageway causing said wobble disc to nutate and exiting through said outlet of said metering assembly, passing through said central chamber and exiting through said outlet of the flow meter;
   d. sensor means located outside of said central chamber and isolated from the fluid for detecting movement of said slugs as said signal generator disc rotates in said central chamber, said sensor means sending a pulsed signal each time a slug passes by said sensor means;
   e. computer means including means for storing data defining a calibrated nonlinear relationship between a K-factor of the meter and a corresponding volumetric flow rate of the meter, said computer means, response to the sensor signal and the relationship data in the storing means, for determining volumetric fluid flow through the electronic nutating disc flow meter and for generating a volumetric signal representative of the determined volumetric fluid flow; and
   f. means, responsive to the volumetric signal, for displaying a fluid volume corresponding to the determined volumetric fluid flow 2. The apparatus of claim 1 wherein said computer means comprises first register means for accumulating said signals over a fixed unit of time, second register means to periodically receive the accumulated total from said first register means, storage means for storing lookup table information, selection means to select lookup table information, means for calculating the incremental volume of fluid flow over said fixed unit of time and means for accumulating batch and cumulative fluid volumes; and wherein said displaying means comprises means for alternatively displaying said batch and said cumulative fluid volumes.

3. The apparatus of claim 1 wherein the storing means includes a plurality of lookup tables defining the calibrated relationship between the K-factor of the meter and the corresponding flow rate of the meter.

4. The apparatus of claim 3 wherein each of said lookup tables are defined by at least three calibration points.

5. The apparatus of claim 3 wherein at least one of said lookup table can be field calibrated with at least three calibration points.

6. The apparatus of claim 1 wherein said friction reducing component for said composite material for said signal generator disc is PTFE.

7. The apparatus of claim 1 wherein said friction reducing component for said composite material for said signal generator disc is carbon.

8. The apparatus of claim 1 wherein said friction reducing component for said composite material for said signal generator disc is molybdenum disulfide.

9. The apparatus of claim 1 wherein there no more than ten ferrous non-magnetized slugs positioned about the circumference of said free floating signal generator.

10. The apparatus of claim 8 wherein the gap between said sensor means and said ferrous, non-magnetized slugs is in the range of 0.097 inches to 0.173 inches.

11. The apparatus of claim 9 wherein said ferrous, non-magnetized slugs are formed from ferrite.

12. The apparatus of claim 1 wherein said displaying means can be axially adjusted for the viewing convenience of the user.

13. The apparatus of claim 1 wherein said displaying means is a liquid crystal display (LCD).

14. The apparatus of claim 1 further comprising:
   means, responsive to operator input, for selecting a particular relationship between the K-factor and its corresponding volumetric flow rate; and
   wherein the computer means includes means for calculating the flow rate based on the particular relationship selected by the operator.

15. The apparatus of claim 14 wherein said means for storing comprises an electrically erasable, programmable read-only memory (EEPROM) for storing a lookup table defining a relationship between the K-factor and its corresponding flow rate.

16. The apparatus of claim 14 wherein the computer means includes means for determining the closest point in the table corresponding to the K-factor and for determining the flow rate based thereon.

17. The apparatus of claim 16 wherein said computer means includes means for interpolating between points in the table to approximate the flow rate.

18. The apparatus of claim 1 further comprising means for switching responsive to the sensor means to provide a signal having one level when the sensor means detects a slug passing thereby and for providing a signal having another level when no slug is detected.

19. The apparatus of claim 18 wherein said switching means comprises a bi-polar transistor for providing a zero volt signal when no slug is detected and for providing a voltage signal when a slug is detected.

20. An electronic flow meter for measuring volumetric fluid flow comprising:
   a. a housing defining a central chamber, said housing having an inlet and an outlet permitting fluid communication with said central chamber;
   b. a metering assembly positioned in said central chamber, said metering assembly defining an internal circular passageway having an inlet and an outlet, said inlet of said metering assembly in fluid communication with said inlet of said housing and said outlet of said metering assembly in communication with said central chamber of said housing, said metering assembly driving a device in response to fluid flow through said metering assembly;

c. means for sensing movement of said device and generating a sensing signal in response to said movement;

d. computer means including means for storing information defining a calibrated nonlinear relationship between the sensing signal of the meter and its corresponding volumetric flow rate of the meter, computer means, responsive to the sensing signal and the relationship in the storing means, for determining a volumetric fluid flow through the flow meter and for generating a volumetric signal representative of the determined volumetric fluid flow; and e. means, responsive to the volumetric signal, for displaying a fluid volume corresponding the determined volumetric fluid flow.

21. The apparatus of claim 20 wherein said means for storing includes means for storing a plurality of tables, each table representing a calibrating curve defining a calibrating nonlinear relationship between the sensing signal and its corresponding volumetric flow rate and having at least two points therein.

22. The apparatus of claim 20 further comprising:
means, responsive to operator input, for selecting a calibrating curve defining a calibrated nonlinear relationship between the sensing signal and its corresponding volumetric flow rate; and
wherein the computer means includes means for calculating the flow rate based on the operator selected calibrating curve.

23. The apparatus of claim 22 wherein said means for storing means comprises an electrically erasable programmable read-only memory (EEPROM) for storing a lookup table defining a relationship between the K-factor and its corresponding flow rate.

24. The apparatus of claim 22 wherein the computer means includes means for determining the closest point in the table corresponding to the K-factor and for determining the flow rate based thereon.

25. The apparatus of claim 24 wherein said computer means includes means for interpolating between points in the table to approximate the flow rate.

26. The apparatus of claim 20 wherein said metering assembly includes a wobble disk positioned in said central chamber, said wobble disk having a protruding drive pin extending through an aperture in said metering chamber; and further including a free-floating signal generator disk positioned in said central chamber between said metering assembly and said housing, said signal generator disk formed from a composite material having a friction-reducing component and including a plurality of ferrous, nonmagnetized slugs positioned about the circumference, said signal generated disk engaging and being rotated by said drive pin as the fluid passes through the electronic nutating disk flow meter along the following flow path: fluid enters through said inlet of said flow meter and passes into said inlet of said metering assembly through said internal passageway causing said wobble disk to nutate and exiting through said outlet of said metering assembly passing through said central chamber and exiting through said outlet of the flow meter.

27. The apparatus of claim 26 wherein said sensing means comprises a pickup coil means located outside of said central chamber and isolated from the fluid for detecting movement of said slugs as said signal generator disk rotates in said chamber, said sensor means sending a sensing signal each time the slug passes by said sensor means.

28. The apparatus of claim 27 further comprising means for switching responsive to the sensor means to provide a signal having one level when the sensor means detects a slug passing thereby and for providing a signal having another level when no slug is detected.

29. The apparatus of claim 28 wherein said switching means comprises a bi-polar transistor for providing a zero volt signal when no slug is detected and for providing a voltage signal when a slug is detected.

30. The apparatus of claim 20 wherein said computer means further comprises means for accumulating said signals over a fixed unit of time, second register means to periodically receive the accumulated total from said first register means, storage means for storing lookup table information, selection means to select lookup table information, means for calculating the incremental volume of said fluid flow over said fixed unit of time and means for accumulating said batch in cumulative fluid volumes; and wherein said displaying means comprises means for alternatively displaying said batch in said cumulative fluid volumes.

31. The apparatus of claim 20 further comprising an electrically erasable, programmable read only memory (EEPROM) for storing a lookup table defining a relationship between a K-factor and its corresponding flow rate.

* * * * *